US007353071B2

(12) United States Patent
Blackwell et al.

(10) Patent No.: US 7,353,071 B2
(45) Date of Patent: Apr. 1, 2008

(54) METHOD AND APPARATUS FOR AUTHORING AND PLAYING BACK LIGHTING SEQUENCES

(75) Inventors: Michael K. Blackwell, Milton, MA (US); Ihor A. Lys, Boston, MA (US); John Warwick, Cambridge, MA (US); Frederick M. Morgan, Quincy, MA (US); Adriana Mincheva, Quincy, MA (US)

(73) Assignee: Philips Solid-State Lighting Solutions, Inc., Burlington, MA (US)

(*) Notice: Subject to any disclaimer, the term of this patent is extended or adjusted under 35 U.S.C. 154(b) by 1091 days.

(21) Appl. No.: 09/870,418

(22) Filed: May 30, 2001

(65) Prior Publication Data

US 2002/0078221 A1 Jun. 20, 2002

Related U.S. Application Data

(63) Continuation-in-part of application No. 09/616,214, filed on Jul. 14, 2000.

(60) Provisional application No. 60/143,790, filed on Jul. 14, 1999.

(51) Int. Cl.
*G05B 11/01* (2006.01)
*G05B 19/18* (2006.01)
*G05B 19/42* (2006.01)

(52) U.S. Cl. .............................. 700/23; 700/2; 700/11; 700/19; 700/88

(58) Field of Classification Search ................ 700/1-5, 700/7-9, 11-17, 19, 23, 24, 27, 83, 86-89; 345/426, 700, 731; 381/306
See application file for complete search history.

(56) References Cited

U.S. PATENT DOCUMENTS

| | | | |
|---|---|---|---|
| 3,898,643 | A | 8/1975 | Ettlinger |
| 4,947,302 | A | 8/1990 | Callahan |
| 4,962,687 | A | 10/1990 | Belliveau et al. |
| 5,209,560 | A | 5/1993 | Taylor et al. |
| 5,307,295 | A | 4/1994 | Taylor et al. |
| 5,334,992 | A | 8/1994 | Rochat et al. |

(Continued)

FOREIGN PATENT DOCUMENTS

DE 4111397 A1 10/1992

(Continued)

OTHER PUBLICATIONS

Adrian b. Ettlinger and Salvatore J. Bonsignore, "A CBS Computerized Lighting Control System," *Journal of the SMPTE*, Apr. 1972, pp. 277-281, vol. 81.

(Continued)

*Primary Examiner*—Leo Picard
*Assistant Examiner*—Sean Shechtman
(74) *Attorney, Agent, or Firm*—Wolf, Greenfield & Sacks, P.C.

(57) ABSTRACT

Systems and methods for authoring and playing back lighting programs that include a plurality of lighting sequences for controlling a plurality of lights. One aspect stores the lighting program in a data format that represents a final data stream capable of directly controlling the plurality of lights. Another aspect allows execution of the lighting program to be modified in response to external stimuli.

53 Claims, 7 Drawing Sheets

U.S. PATENT DOCUMENTS

| | | | | |
|---|---|---|---|---|
| 5,406,176 | A | 4/1995 | Sugden | |
| 5,592,602 | A | 1/1997 | Edmunds et al. | 395/174 |
| 5,621,282 | A | 4/1997 | Haskell | |
| 5,629,587 | A | 5/1997 | Gray et al. | |
| 5,659,793 | A | 8/1997 | Escobar et al. | |
| 5,732,184 | A | 3/1998 | Chao et al. | |
| 5,739,823 | A | 4/1998 | Akaza et al. | |
| 5,769,527 | A | 6/1998 | Taylor et al. | |
| 5,889,514 | A | 3/1999 | Boezman et al. | 345/302 |
| 5,945,993 | A | 8/1999 | Fleischmann | |
| 5,986,414 | A | 11/1999 | Bocchicchio et al. | |
| 6,020,825 | A | 2/2000 | Chansky et al. | |
| 6,031,343 | A | 2/2000 | Rechnagel et al. | |
| 6,361,198 | B1 | 3/2002 | Reed | |
| 6,466,234 | B1 | 10/2002 | Pyle et al. | |
| 6,495,964 | B1 | 12/2002 | Muthu et al. | |
| 2003/0018609 | A1 | 1/2003 | Phillips et al. | |

FOREIGN PATENT DOCUMENTS

| | | | |
|---|---|---|---|
| EP | 0752632 | A2 | 1/1987 |
| EP | 04953052 | A2 | 7/1992 |
| FR | 2 628 335 | | 9/1989 |
| JP | 06-350816 | | 12/1994 |
| JP | 10208886 | | 8/1998 |
| WO | WO98/52175 | | 11/1998 |
| WO | WO 99/31560 | | 6/1999 |

OTHER PUBLICATIONS

D.C. Irving, "Techniques of Stage and Studio Lighting Control," *Proceedings of the IREE,* Nov. 1975, pp. 359-364.

www.jandsvista.com/features.html, Nov. 8, 2005.

Congo, the Avab Board by ETC, Datasheet from Electronic Theatre Controls, Jun. 6, 2005.

Multivision, Trax Media Control, *Production Partner,* Aug. 1997, pp. 82-83, (also 2 unnumbered pages).

Dataton Trax True Multimedia 3, User's Guide, 1996, 440 pgs.

Dataton Trax True Multimedia 3.6 Addendum, 1998, 141 pgs.

Dorsey et al., Interactive Design of Complex Time-Dependant Lighting, *IEEE Computer Graphics and Applications,* Mar. 1995, pp. 26-36.

ERCO Lighting Program, 1996/97 Edition, pp. 1-12.

Auszug eines Screenprints der Bildschirmanzeige des Systems gemäβ unter Verwendung einer Software-Version aus dem Jahre 1998 (1 page).

Screenprints der Bildschirmanzeige des Systems D7 unter Verwendung einer Software-Version aus dem Jahre 1995 (3 pages).

Ein Photo eines Datenträgers der Software-Version von 1995 (1 page).

Opposition Brief, Aug. 2, 2006, by Zumtobel Lighting GmbH, opposing European Patent No. 1,224,845 B1, pp. 1-12.

Opposition Brief, Aug. 2, 2006, by ERCO Leuchten GmbH, opposing European Patent No. 1,224,845 B1, pp. 1-21.

International Search Report from PCT Application PCT/US00/19274.

500
515
510
520
Color Kinetics ColorPlay
Group
C200-1
C200-2
C200-3
Cross Fade
Random Color
ColorWash
Effects
Fixed Color
Cross Fade
Random Color
Color Wash
Chasing Rainbow
Strobe
Sparkle
Effect Properties
Cross Fade
Priority
Start Color
End Color
Pick...
552
554
558
560
565
564
568
575

METHOD AND APPARATUS FOR AUTHORING AND PLAYING BACK LIGHTING SEQUENCES

This application is a continuation-in-part of U.S. patent application Ser. No. 09/616,214, filed Jul. 14, 2000, which is incorporated herein by reference and claims the benefit of U.S. provisional patent application Ser. No. 60/143,790, filed Jul. 14, 1999.

FIELD OF THE INVENTION

The present invention relates generally to systems and methods for controlling lighting systems, and more particularly to systems and methods for designing lighting sequences and executing such sequences on lighting systems.

BACKGROUND OF THE INVENTION

Most modern-day lighting controllers are designed to control white light (or monochromatic light) in a theatrical or business setting. A light producing monochromatic light, such as green, blue, or red light, can be changed primarily along a single dimension—brightness—from off to a maximum brightness. Current controllers permit a user to specify a brightness for each light over time.

This method becomes increasingly more complicated for lights capable of changing the color of emitted light, because the resulting color and intensity is a combination of the intensity of multiple component colors, each of which can be set independent of the others for a particular light. Thus, the output is a function of multiple dimensions, rather than one, to be specified for each point in time, greatly increasing the effort and time involved in creating an effect.

U.S. Pat. No. 5,307,295 to Taylor et al. describes a system for creating lighting sequences which simplifies some aspects of creating a lighting sequence, but many of the parameters still need to be specified for each light, much as they would be on a standard lighting console. A more intuitive method for designing lighting sequences would not only simplify and speed up the designing process, but would permit users to design lighting sequences with less training and experience than is often necessary today.

Furthermore, although sequences can be created and played back by traditional methods, the content of the sequences typically progresses with time and is not subject to modification during playback. For example, if a dramatic scene requires a flash of lightning to be simulated at a certain time, this effect is typically achieved either by meticulously timing the staging to make the programmed flash and the critical moment coincide, or by manually effecting the flash at the critical moment. Such techniques either require considerable reliance on chance or preclude reliance on automation.

SUMMARY OF THE INVENTION

One illustrative embodiment is directed to a method for executing a lighting program to control a plurality of lights, the lighting program defining a plurality of states for the plurality of lights. The method comprises acts of: (A) transferring the lighting program from a first device on which the lighting program was created to at least one computer readable medium, the lighting program being transferred in a data format that represents a final data stream capable of directly controlling the plurality of lights; (B) coupling the computer readable medium to a second device; (C) coupling the second device to the plurality of lights; and (D) executing the lighting program on the second device by reading the final data stream from the computer readable medium and passing the final data stream to the plurality of lights to control the plurality of lights.

Another illustrative embodiment is directed to a computer readable medium encoded with a lighting program that, when executed, controls a plurality of lights and defines a plurality of states for the plurality of lights, the lighting program being encoded in a data format that represents a final data stream capable of directly controlling the plurality of lights.

A further illustrative embodiment is directed to an apparatus for executing a lighting program to control a plurality of lights, the lighting program defining a plurality of states for the plurality of lights. The apparatus comprises at least one storage medium to store the lighting program in a data format that represents a final data stream capable of directly controlling the plurality of lights; and at least one controller that executes the lighting program by reading the final data stream from the computer readable medium and passing the final data stream to the plurality of lights to control the plurality of lights.

Another illustrative embodiment is directed to a method for executing a lighting program to control a plurality of lights, the lighting program including a sequence of commands for controlling the plurality of lights. The method comprises acts of: (A) executing the lighting program on a second device by reading the lighting program from the computer readable medium and passing the sequence of commands to the plurality of lights to control the plurality of lights; and (B) during execution of the lighting program in act (A), changing a parameter of at least one effect assigned, in the lighting program, to at least one of the plurality of lights from a programmed parameter to a new parameter in response to an input received at the second device.

A further illustrative embodiment is directed to a method for executing a lighting program to control a plurality of lights, the lighting program including a sequence of commands for controlling the plurality of lights. The method comprises acts of: (A) executing the lighting program on a second device by reading the lighting program from the computer readable medium and passing the sequence of commands to the plurality of lights to control the plurality of lights; and (B) during execution of the lighting program in act (A), changing a speed at which the lighting program is executed from a programmed speed to a new speed in response to an input received at the second device.

Another illustrative embodiment is directed to an apparatus for executing a lighting program to control a plurality of lights, the lighting program including a sequence of commands for controlling the plurality of lights. The apparatus comprises at least one storage medium to store the lighting program; at least one input to receive information concerning an external environment; and at least one controller that executes the lighting program by reading the lighting program from the computer readable medium and passing the sequence of commands to the plurality of lights to control the plurality of lights, wherein, during execution of the lighting program, the controller changes a parameter of at least one effect assigned, in the lighting program, to at least one of the plurality of lights from a programmed parameter to a new parameter in response to the received information.

A further illustrative embodiment is directed to an apparatus for executing a lighting program to control a plurality of lights, the lighting program including a sequence of commands for controlling the plurality of lights. The apparatus comprises at least one storage medium to store the lighting program; at least one input to receive information concerning an external environment; and at least one controller that executes the lighting program by reading the lighting program from the computer readable medium and passing the sequence of commands to the plurality of lights to control the plurality of lights, wherein, during execution of the lighting program, the controller changes a speed at which the lighting program is executed from a programmed speed to a new speed in response to the received information.

Another illustrative embodiment is directed to an apparatus for executing a lighting program to control a plurality of lights, the lighting program including a sequence of commands for controlling the plurality of lights. The apparatus comprises at least one storage medium to store the lighting program; a plurality of inputs to receive information concerning an external environment; a cue table that includes a plurality of functions to interpret actions to be taken during execution of the lighting program based upon combined information received at the plurality of inputs; at least one controller, coupled to the cue table, that executes the lighting program by reading the lighting program from the computer readable medium and passing the sequence of commands to the plurality of lights to control the plurality of lights, wherein, during execution of the lighting program, the controller changes execution of the light program based upon information received from the cue table.

A further illustrative embodiment is directed to a system for preparing and playing back a light sequence. The system comprises an authoring interface displaying information representative of a plurality of lighting effects; a sequence authoring module to permit a user to select a lighting effect, a lighting unit to execute the lighting effect, a start time for the lighting effect, and a stop time for the lighting effect; and a playback device, coupled to the lighting unit, to playback the light sequence.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

DETAILED DESCRIPTION OF THE ILLUSTRATED EMBODIMENTS

Figure 1:
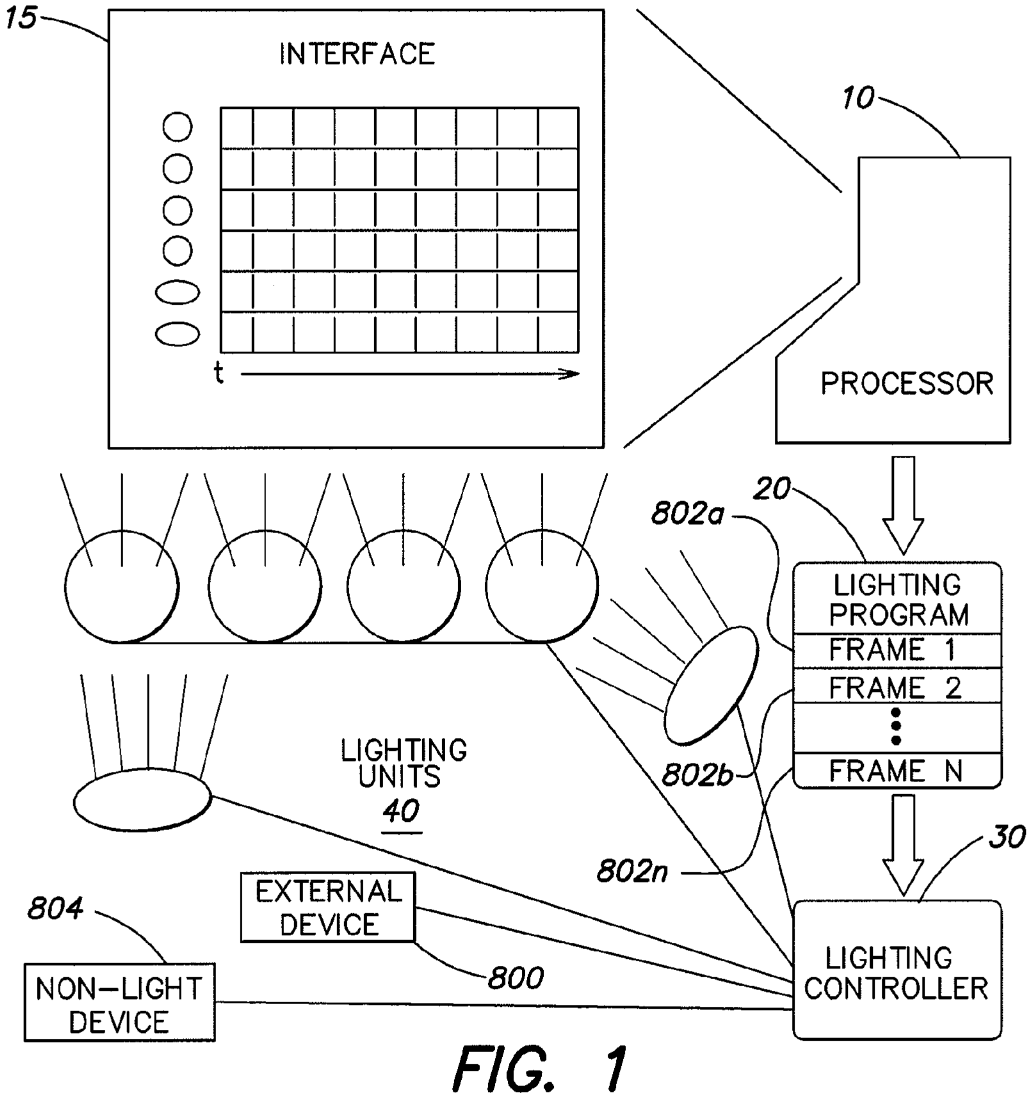
FIG. 1 illustrates a system for creating a lighting sequence and executing the lighting sequence on a plurality of lighting units according to one embodiment of the invention.

One embodiment of the invention is directed to a system on which a user can author a lighting program including one or more lighting sequences. An example of such a system is shown in FIG. 1, and includes a processor 10 supporting a software application, having an interface 15, which can be used to create a lighting program 20, which may include one or more lighting sequences. Another embodiment of the invention is directed to a lighting controller 30 which can execute or playback the lighting sequence 20, and in response thereto, which controls one or more lighting units 40. The term "sequence" in the context of this disclosure refers to two or more lighting effects spaced in time.

The software application may be implemented in any of numerous ways, as the invention is not limited to any particular implementation. For example, the software application may be a stand-alone application, such as an executable image of a C++ or Fortran program or other executable code and/or libraries, or may be implemented in conjunction with or accessible by a Web browser, e.g., as a Java applet or one or more HTML web pages, etc. Processor 10 may be any system for processing in response to a signal or data, as the present invention is not limited to any particular type of processor. For example, the processor 10 may comprise microprocessors, microcontrollers, other integrated circuits, computer software, computer hardware, electrical circuits, application-specific integrated circuits, personal computers, chips, and other devices alone or in combination capable of providing processing functions. For example, processor 10 can be any suitable data processing platform, such as a conventional IBM PC workstation operating the Windows operating system, a SUN workstation operating a version of the Unix operating system, such as Solaris, or any other suitable workstation.

Controller 30 may communicate with lighting units 40 by radio frequency (RF), ultrasonic, auditory, infrared (IR), optical, microwave, laser, electromagnetic, any type of computer link (e.g., a network) or any other suitable transmission or connection technique. A suitable protocol may be used for transmission between the controller 30 and the lighting units 40, including sending pulse-width modulated signals over a protocol such as DMX, RS-485, RS-232, or any other suitable protocol. Lighting units 40 may be incandescent, LED, fluorescent, halogen, laser, or any other type of light source. Each lighting unit may be associated with a predetermined assigned address either unique to that lighting unit or overlapping the address of other lighting units to facilitate communication with the controller 30. In certain embodiments, a single component may be capable both of permitting a user to create a lighting program and controlling the lighting units, and the present invention is intended to encompass this and other variations on the system depicted in FIG. 1 which can be used to implement the methods described below. For example, the processor 10 can have software loaded thereon to enable it to perform not only the authoring functions described below, but also the playback functions described below as being performed by the controller 30. In certain embodiments, the functions described below as being performed by the software application alternatively may be provided by a hardware device, such as a chip or card, or any other system capable of performing the functions described herein.

Figure 2:
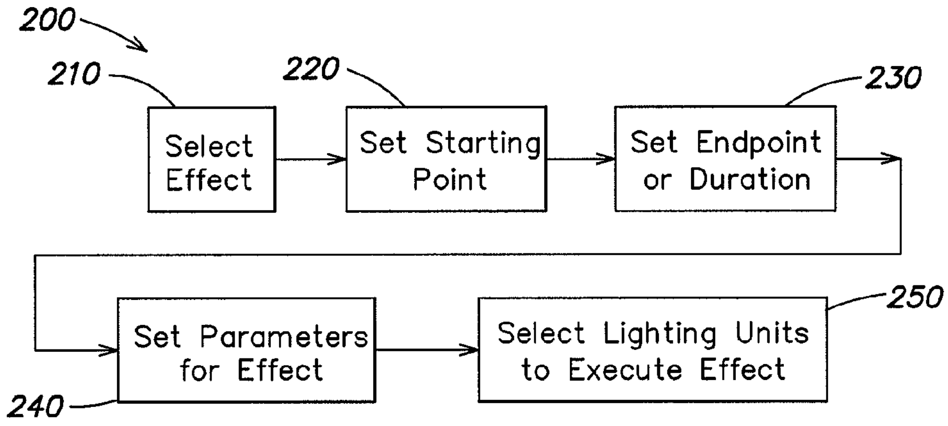
FIG. 2 presents an exemplary method for creating a lighting effect in accordance with one embodiment of the invention.

An illustrative method 200 for creating a lighting sequence is described making reference to FIG. 2. According to the method, a user may select from among a set of predetermined 'stock' effects at step 210. The stock effects function as discrete elements or building blocks useful for assembling a sequence. Additionally, a user may compose a particular sequence and include that sequence in the stock effects to eliminate the need for creating repeated elements each time the effect is desired. For example, the set of stock effects may include a dimming effect and a brightening effect. A user may compose a pulse effect by specifying the alternation of the dimming and brightening effects, and include the pulse effect in the set of stock effects. Thus, each time a pulse effect is thereafter desired, the stock effect can be utilized without the need for repeatedly selecting dimming and brightening effects to achieve the same goal. In certain embodiments, stock effects may be created by a user via any programming language, such as Java, C, C++, or any other suitable language. Effects may be added to the set of stock effects by providing the effects as plug-ins, by including the effects in an effects file, or by any other technique suitable for organizing effects in a manner that permits adding, deleting, and altering the set of effects.

The user may indicate a time at which the selected effect should begin at step 220. For example, the user may indicate that a brightening effect should start three minutes after a sequence commences. Additionally, the user may select an ending time or duration for the selected effect at step 230. Thus, by indicating that the effect should end five minutes after the sequence commences, or equivalently by indicating that the effect should last for two minutes, a user may set the time parameters of the selected effect. Additional parameters may be specified by the user at step 240, as may be appropriate for the particular effect. For example, a brightening or dimming effect may be further defined by an initial brightness and an ending brightness. The rate of change may be predetermined, i.e., the dimming effect may apply a linear rate of dimming over the assigned timespan, or may be alterable by the use, e.g., may permit slow dimming at the beginning followed by a rapid drop-off, or by any other scheme the user specifies. Similarly, a pulse effect, as described above, might instead be characterized by a maximum brightness, a minimum brightness, and a periodicity, or rate of alternation. Additionally, the mode of alternation may be alterable by the user, e.g., the changes in brightness may reflect a sine function or alternating linear changes. In embodiments wherein color-changing lights are employed, parameters such as initial color, final color, rate of change, etc. may be specified by the user. It should be appreciated that the particular effects and parameters therefore described above are provided merely for illustrative purposes, and that the present invention is not limited to these effects or parameters, as numerous other lighting effects and parameters can be employed in accordance with the embodiments of the invention described herein.

Finally, the user may select, at step 250, one or more lighting units to execute the effect selected in step 210.

In certain embodiments, a user may specify a transition between two effects which occur in sequence. For example, when a pulse effect is followed by a dimming effect, the pulse effect may alternate less rapidly, grow gradually dimmer, or vary less between maximum and minimum brightness towards the termination of the effect. Techniques for transitioning between these or other effects may be determined by the user for each transition, e.g., by selecting a transition effect from a set of predetermined transition effects, or by setting transition parameters for the beginning and/or end of one or both effects.

In a further embodiment, users may specify multiple lighting effects for the same lighting unit that place effects overlapping in time or in location. These overlapping effects may be used in an additive or subtractive manner such that the multiple effects interact with each other. For example, a user could impose a brightening effect on a pulsing effect, with the brightening effect imposing the minimum brightness parameter of the pulse to give the effect of pulsing slowly growing to a steady light.

In one embodiment of the invention, lighting effects can have priorities or cues attached to them which could allow a particular lighting unit to change effect on the receipt of a cue. This cue could be any type of cue, received externally or internally to the system, and includes, but is not limited to, a user-triggered cue such as a manual switch or bump button; a user-defined cue such as a certain keystroke combination or a timing key allowing a user to tap or pace for a certain effect; a cue generated by the system such as an internal clocking mechanism, an internal memory one, or a software based one; a mechanical cue generated from an analog or digital device attached to the system such as a clock, external light or motion sensor, music synchronization device, sound level detection device, or a manual device such as a switch; a cue received over a transmission medium such as an electrical wire or cable, RF signal or IR signal; or a cue received from a lighting unit attached to the system. The priority can allow the system to choose a default priority effect that is the effect used by the lighting unit unless a particular cue is received, at which point the system instructs the use of a different effect. This change of effect could be temporary, occurring only while the cue occurs or defined for a specified period, could be permanent in that it does not allow for further receipt of other effects or cues, or could be priority based, waiting for a new cue to return to the original effect or select a new one. Alternatively, the system could select effects based on the state of a cue and the importance of a desired effect. For instance, if a sound sensor sensed sudden noise, it could trigger a high priority alarm lighting effect overriding all the effects otherwise present or awaiting execution. The priority could also be state dependent where a cue selects an alternative effect or is ignored depending on the current state of the system. Again, it should be appreciated that the embodiments of the present invention that employ priorities or queues for various lighting effects are not limited to the particular types of queues and priorities discussed above, as numerous other types are possible.

In certain embodiments, the outcome of one effect may be programmed to depend upon a second effect. For example, an effect assigned to a first lighting unit may be a random color effect, and an effect assigned to a second lighting unit may be designated to match the color of the random color effect. Alternatively, one lighting unit may be programmed to execute an effect, such as a Hashing effect, whenever a second lighting unit meets a certain condition, such as being turned off. Even more complex arrangements, such as an effect which is initiated upon a certain condition of a first effect, matches the color of a second effect and the rate of a third effect, can be created by this scheme. It should be appreciated that the above-described examples of combinations of effects or parameters being dependent upon other effects or parameters is provided merely for illustrative purposes, as the present invention is not limited to these specific examples, as numerous other dependencies and combinations are possible.

In still other embodiments, the systems and methods described herein permit the playback of a lighting sequence to be influenced by external inputs during performance such as any of the examples of cues described above. For example, a lighting sequence or effect may be programmed to start upon receipt of a cue or trigger signal, a sequence or effect may take precedence if a cue or trigger signal is received, a sequence or effect may be designated to repeat or continue until a cue or trigger signal is received, etc. Thus, instead of assigning a discrete start time to an effect or sequence, a user may instead designate that effect or sequence to begin when a certain stimulus is received. Furthermore, during creation, a user may designate two or more effects for overlapping or concurrent time periods and assign the effects different priorities or conditions to determine which effect is executed upon playback. In yet another embodiment, a user may link a parameter for an effect to an external input (e.g., any of the types of inputs described above, including analog, digital or manual inputs) such that the color, speed, or other attribute of an effect may depend on a signal from an external device, measuring, for example, volume, brightness, temperature, pitch, inclination, wave length, or any other appropriate condition. Thus, the selection of a lighting sequence, the selection of an effect, or the selection of a parameter may be determined or influenced by input from an external source, such as a user, chronometer, device, or sensor. Of course, the types of external stimuli, cues and triggers described above, as well as the changes in a lighting effect or parameter influenced thereby, are provided merely for illustrative purposes, as numerous other variations are possible. In the embodiment of FIG. 1, an exemplary external device 800 is connected to lighting controller 30 to illustrate such external inputs. Other embodiments can include more than one external device.

In event-driven embodiments, such as those using external inputs and those using outputs of other effects as inputs, a menu may be provided to define inputs and the consequences thereof. For example, a palette of predetermined inputs may be provided to a user. Each input, such as a specified transducer or the output of another effect, may be selected and placed within an authored lighting sequence as a trigger for a new effect, or as a trigger to a variation in an existing effect. Known inputs may include, for example, thermistors, clocks, keyboards, numeric keypads, Musical Instrument Digital Interface ("MIDI") inputs, DMX control signals, TTL or CMOS logical signals, other visual or audio signals, or any other protocol, standard, or other signaling or control technique, whether analog, digital, manual, or any other form. The palette may also include a custom input, represented as, for example, an icon in a palette, or an option in a drop-down menu. The custom input may allow a user to define the characteristics of an input signal (e.g., its voltage, current, duration, and/or form (i.e., sinusoid, pulse, step, modulation)) that will operate as a control or trigger in a sequence.

For instance, a theatrical lighting sequence may include programmed lighting sequences and special effects in the order in which they occur, but requiring input at specified points before the next sequence or portion thereof is executed. In this way, scene changes may take place not automatically as a function of timing alone, but at the cue of a director, producer, stage hand, or other participant. Similarly, effects which need to be timed with an action on the stage, such as brightening when an actor lights a candle or flips a switch, dramatic flashes of lightning, etc., can be indicated precisely by a director, producer, stage hand, or other participant—even an actor—thereby reducing the difficulty and risk of relying on preprogrammed timing alone.

As should be appreciated from the foregoing, input from sensors can also be used to modify lighting sequences. For example, a light sensor may be used to modify the intensity of the lights, for example, to maintain a constant lighting level regardless of the amount of sunlight entering a room, or to make sure a lighting effect is prominent despite the presence of other sources of light. A motion sensor or other detector may be used as a trigger to start or alter a lighting sequence. For example, a user may program a lighting sequence for advertising or display purposes to change when a person approaches a sales counter or display. Temperature sensors may also be used to provide input. For example, the color of light in a freezer may be programmed to be dependent on temperature, e.g., providing blue light to indicate cold temperature, changing gradually to red as the temperature rises, until a critical temperature is reached, whereupon a flashing or other warning effect may begin. Similarly, an alarm system may be used to provide a signal that triggers a lighting sequence or effect for providing a warning, distress signal, or other indication. An interactive lighting sequence may be created, e.g., wherein the executed effect varies according to a person's position, movements, or other actions. It should be appreciated that the types of sensors described herein, and their modifying effect on a light sequence, are provided merely for illustrative purposes, as numerous other types of sensors can be employed, and numerous other lighting effects or parameters can be modified in response to inputs from these or other types of sensors.

Figure 3:
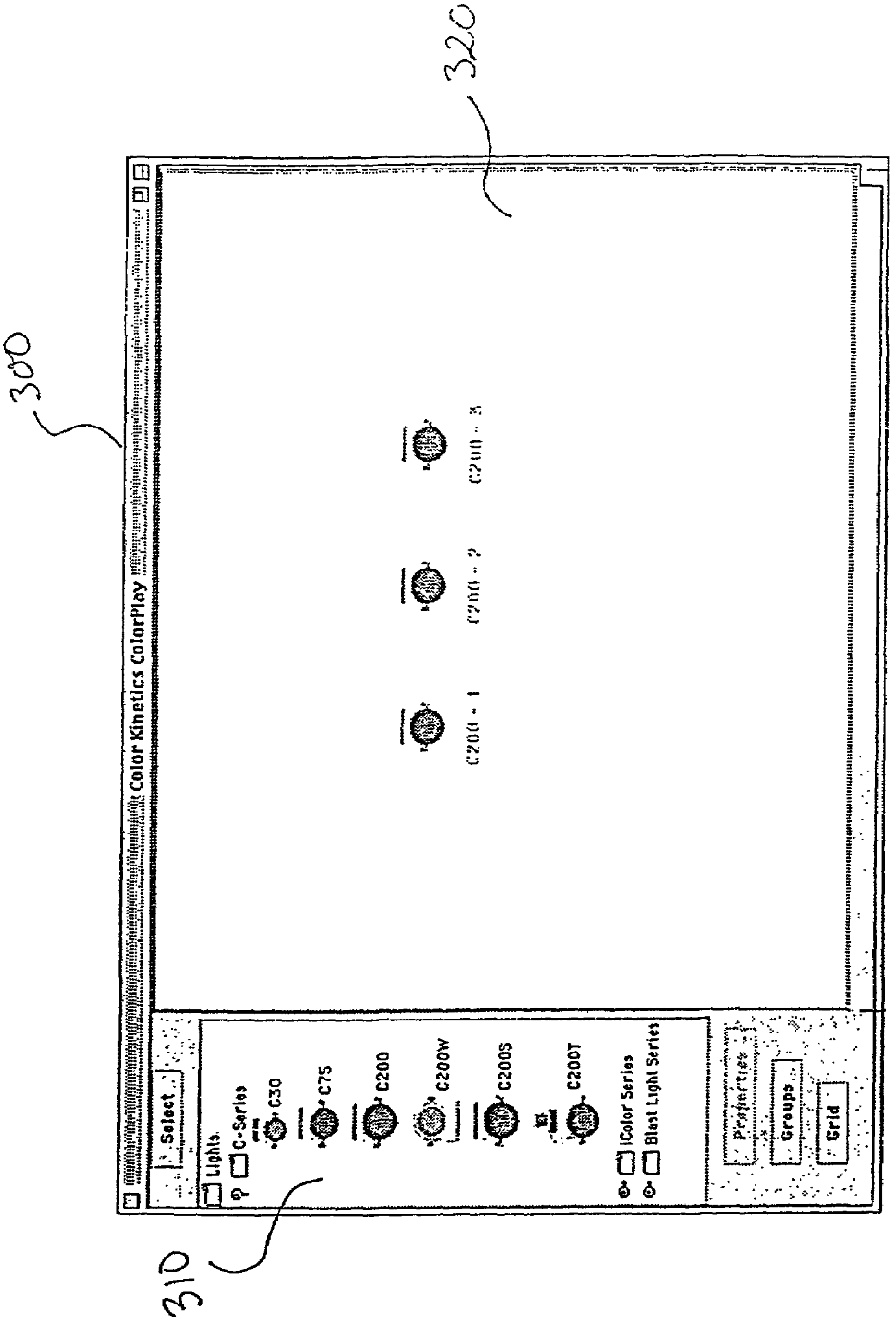
FIG. 3 depicts a representative interface for describing an arrangement of lighting units in accordance with another embodiment of the invention.

In certain embodiments, a user may provide information representative of the number and types of lighting units and the spatial relationships between them. For example, an interface 300 may be provided as depicted in FIG. 3, such as a grid or other two-dimensional array, that permits the user to arrange icons or other representative elements to represent the arrangement of the lighting units being used. In one embodiment, depicted in FIG. 3, the interface 300 provides to a user a selection of standard types of lighting units 310, e.g., cove lights, lamps, spotlights, etc., such as by providing a selection of types of lighting units in a menu, on a palette, on a toolbar, etc. The user may then select and arrange the lighting units on the interface, e.g., within layout space 320 in an arrangement which approximates the physical arrangement of the actual lighting units. It should be appreciated that numerous different types of user interfaces can be employed, and that the embodiments of the present invention described herein are not limited to the use of any particular user interface, or any specific technique for representing the number and types of lighting units and their spatial relationship.

In certain embodiments, the lighting units may be organized into different groups, e.g., to facilitate manipulation of a large number of lighting units. Lighting units may be organized into groups based on spatial relationships, functional relationships, types of lighting units, or any other scheme desired by the user. Spatial arrangements can be helpful for entering and carrying out lighting effects easily. For example, if a group of lights are arranged in a row and this information is provided to the system, the system can then implement effects such as a rainbow or a sequential flash without need for a user to specify a separate and individual program for each lighting unit. All the above types of implementation or effects could be used on a group of units as well as on single lighting units. The use of groups can also allow a user to enter a single command or cue to control a predetermined selection of lighting units.

A lighting sequence can be tested or executed on a lighting system to experience the effects created by the user. Additionally, the interface 300 may be capable of reproducing a lighting sequence created by the user, for example, by recreating the programmed effects as though the icons on the interface were the lighting units to be controlled. Thus, if a lighting sequence specified that a certain lighting unit gradually brightens to a medium intensity, upon playback, the icon representing that lighting unit may start black and gradually lighten to gray. Similarly, color changes, flashing, and other effects can be visually represented on the interface. This function may permit a user to present a wholly or partially created lighting sequence on a monitor or other video terminal, pause playback, and modify the lighting sequence before resuming playback, to provide a highly interactive method for show creation. In a further embodiment, the system could allow fast-forwarding, reversing, rewinding, or other functions to allow editing of any portion of the lighting sequence. In a still further embodiment, the system could use additional interface features like those known in the art. This can include, but is not limited to, non-linear editing such as that used in the Adobe or such devices or controls as scrolls, drag bars, or other devices and controls.

Figure 4:
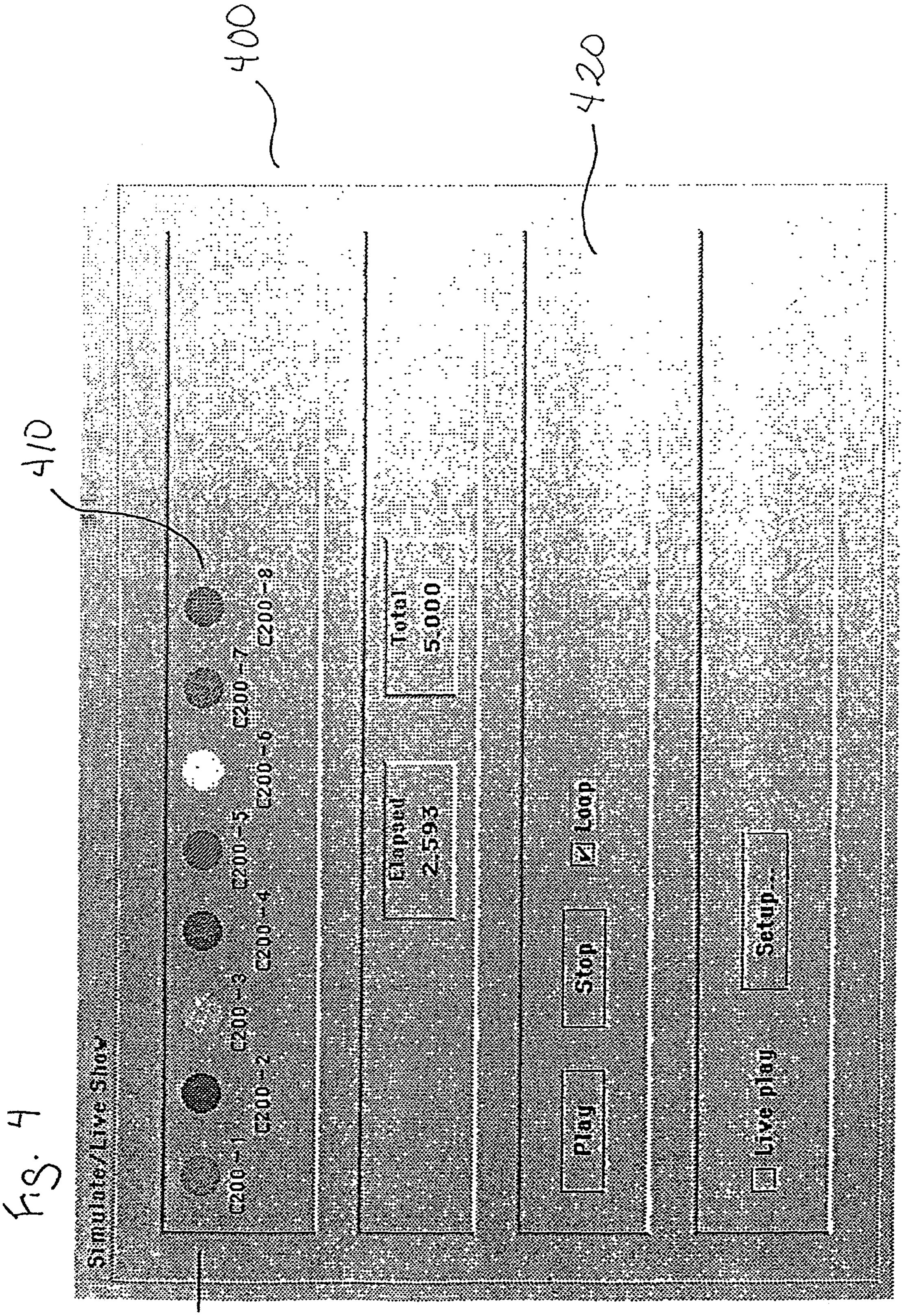
FIG. 4 represents an alternate interface for graphically reproducing a lighting sequence.

An alternate interface 400 for reproducing a lighting sequence is presented in FIG. 4. Interface 400 includes representations of lighting elements 410 and playback controls 420. It should be appreciated that the present invention is not limited to the above-described techniques for visualizing a lighting sequence, as numerous other techniques are possible.

Figure 5:
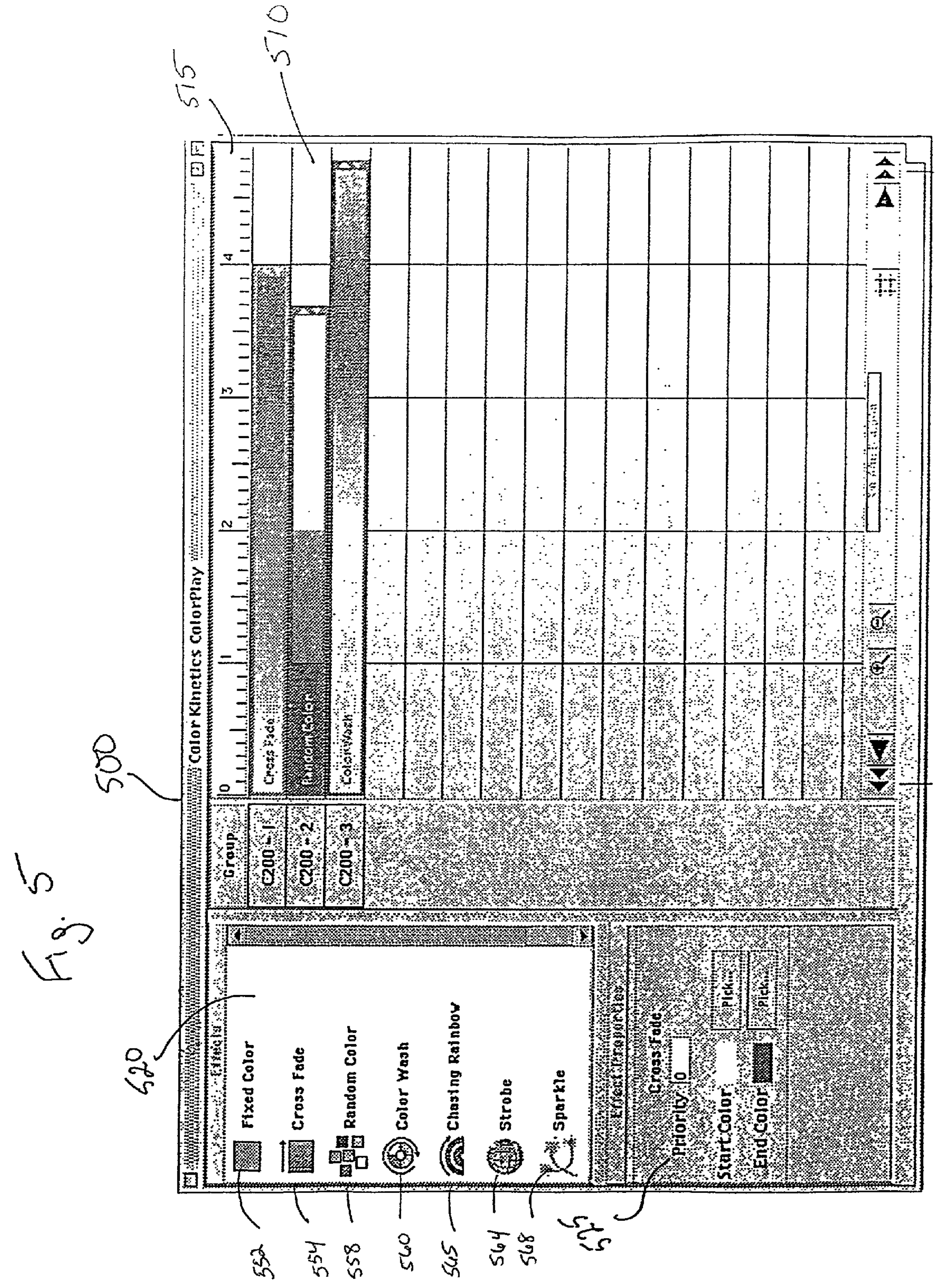
FIG. 5 portrays a representative interface for creating a lighting sequence in accordance with one embodiment of the invention.

An interface capable of representing the lighting sequence may also be used during authoring or entry of the lighting sequence. For example, a grid, such as interface 15 of FIG. 1, may be employed, wherein available lighting units are represented along one axis and time is represented along a second axis. Thus, when a user specifies that a certain lighting unit gradually brightens to a medium intensity, the portion of the grid defined by that lighting unit, the start time, and the ending time may appear black at one end of the grid portion and gradually lighten to gray at the other end of the grid portion. In this way, the effect can be visually represented to the user on the interface as the lighting sequence is being created. In certain embodiments, effects that are difficult to represent with a static representation, such as flashing, random color changes, etc., can be represented kinetically on the interface, e.g., by flashing or randomly changing the color of the defined grid portion. An example of an interface 500 representing a sequence for an assortment of three lighting units is shown in FIG. 5. Time chart 510 visually depicts the output of each of the three lights at each moment in time according to the temporal axis 515. At a glance, the user can readily determine what effect is assigned to any lighting unit at any point in time, simplifying the coordination of effects across multiple lighting units and allowing rapid review of the lighting sequence.

Additionally, FIG. 5 depicts a palette 520 which includes the stock effects from which a user may select lighting effects, although other techniques for providing the set of stock effects, such as by a menu, toolbar, etc., may be employed in the systems and methods described herein. In palette 520 there are provided icons for stock effects for the lighting of a fixed color effect 552, a cross fade between two color effects 554, a random color effect 558, a color wash effect 560, a chasing rainbow effect 565, a strobe effect 564, and a sparkle effect 568. This list is by no means exhaustive and other types of effects can be included. To assign an effect to a lighting unit, the user may select an effect from the palette and select a region of the grid corresponding to the appropriate lighting unit or units and the desired time interval for the effect. Additional parameters may be set by any suitable technique, such as by entering numerical values, selecting options from a palette, menu, or toolbar, drawing a vector, or any other technique known in the art, such as the parameter entry field 525. Other interfaces and techniques for entry of lighting sequences suitable for performing some or all of the various functions described herein may be used and are intended to be encompassed by the scope of this disclosure. Examples of functions and interfaces suitable for use with the invention may be found in "A Digital Video Primer," June, 2000, by the Adobe Dynamic Media Group, Adobe Systems, Inc., incorporated herein by reference.

The methods described above can be readily adapted for controlling devices 804 other than lighting units. For example, in a theatrical setting, fog machines, sound effects, wind machines, curtains, bubble machines, projectors, stage practicals, stage elevators, pyrotechnical devices, backdrops, and any other features capable of being controlled by a computer may be controlled by a sequence as described herein. In this way, multiple events can be automated and timed. For example, the user may program the lights to begin to brighten as the curtain goes up, followed by the sound of a gunshot as the fog rolls over the stage. In a home, for example, a program (e.g., 20) can be used to turn on lights and sound an alarm at 7:00 and turn on a coffee maker fifteen minutes later. Holiday lighting arrays, e.g., on trees or houses, can be synchronized with the motion of mechanical figurines or musical recordings. An exhibit or amusement ride can coordinate precipitation, wind, sound, and lights in a simulated thunderstorm. A greenhouse, livestock barn, or other setting for growing living entities can synchronize ambient lighting with automated feeding and watering devices. Any combination of electromechanical devices can be timed and/or coordinated by the systems and methods described herein. Such devices may be represented on an interface for creating the sequence as additional lines on a grid, e.g., one line for each separate component being controlled, or by any other suitable means. Effects of these other devices can also be visually represented to the user. For instance, continued use of a smoke machine could slowly haze out other grids, a coffee maker could be represented by a small representation of a coffee maker that appears to brew coffee on the interface as the action occurs at the device or the interface can show a bar slowing changing color as feed is dispensed in a livestock barn. Other types of static or dynamic effects are also possible.

In certain embodiments, wherein the lighting units are capable of motion, e.g., by sliding, pivoting, rotating, tilting, etc., the user may include instructions for the motion or movement of lighting units. This function may be accomplished by any means. For example, if the lighting unit includes a motor or other system capable of causing movement, the desired movement may be effected by selecting a motion effect from a set of motion effects, as described for lighting effects above. Thus, for example, a lighting unit capable of rotating on its base may be selected, and a rainbow wash effect may be programmed to occur simultaneously with a rotating motion effect. In other embodiments, lighting units may be mounted on movable platforms or supports which can be controlled independently of the lights, e.g., by providing an additional line on a grid interface as described above. Motion effects may also have parameters, such as speed and amount (e.g., an angle, a distance, etc.), that can be specified by the user. Such light/motion combinations may be useful in a wide variety of situations, such as light shows, planetarium presentations, moving spotlights, and any other scenario in which programmable moving lights may be desirable.

Similarly, instructions for controlling objects placed between a lighting unit and an object being illuminated, such as gobos, stencils, filters, lenses, irises and other objects through which light may pass, can be provided by a user according to the systems and methods described herein. In this manner, an even wider array of lighting effects may be designed and preprogrammed for later execution.

One embodiment of the present invention is directed to a computer system configured to design or create a lighting sequence according to the systems and methods described herein, e.g., by executing (e.g., on the processor 10 in FIG. 1) a computer program in a computer language, either interpreted or compiled, e.g., Fortran, C, Java, C++, etc. Another embodiment of the invention is directed to a disk, CD, or other computer-readable storage medium that encodes a computer program that, when executed, is capable of performing some or all of the functions described above which enable a user to create or design a lighting sequence which can be used to control a plurality of lighting units.

A lighting sequence may be recorded on a storage medium, such as a compact disk, floppy disk, hard drive, magnetic tape, volatile or non-volatile solid state memory device, or any other computer-readable storage medium. The lighting sequence may be stored in a format that records the effects and their parameters as created by a user, in a format converted from that format into a format which represents the final data stream, e.g., suitable for directly controlling lighting units or other devices, or in any other suitable format. In this respect, it should be appreciated that the format in which a lighting sequence is created in any of the manners described above may not be compatible for directly controlling a lighting network, such that some format conversion may be required between the format used for creating the lighting sequence, and a format for controlling a plurality of lighting units. When such a conversion is desired, it can be performed at various different times, as the embodiments of the present invention described herein are not limited to any particular conversion time or technique. Thus, the lighting sequence can be recorded on a storage medium either in the format in which it was created, in a format suitable for controlling a lighting network (such that the conversion will take place before storing the lighting sequence), or any other suitable format. Examples of formats that can be used for controlling a plurality of lighting units include data streams in data formats such as DMX, RS-485, RS-232, etc.

It should be appreciated that lighting sequences may be linked to each other, e.g., such that at the conclusion of one sequence, another sequence is executed, or a master sequence may be created for coordinating the execution of a plurality of subsequences, e.g., based on external signals, conditions, time, randomly, etc.

In one embodiment of the present invention, the same system that is used to author a lighting sequence can also be used to play it back and thereby control a plurality of lighting units 40. For example, when the lighting program is authored on a general purpose computer, (e.g., including a display that comprises the interface 15 and a processor that serves as the processor 10 shown in FIG. 1), that same general purpose computer can playback the lighting program, and thereby perform the functions of the lighting controller 30 shown in FIG. 1. In this respect, the general purpose computer can be coupled to the plurality of lights 40 in any suitable manner, examples of which are discussed above.

It should be appreciated that in many instances, it may be desirable to author a lighting program on one device (e.g., a general purpose computer), but play it back on a different device. For example, a retail store may desire to author a lighting program that can then be played back at multiple retail locations. While it is possible to interconnect multiple locations to the device on which the lighting program was authored (e.g., over the Internet), it may be desirable in some circumstances to have each of the retail locations be capable of controlling playback of the lighting program individually. Furthermore, there may also be situations where lighting displays are mobile, such that it is not assured that in every location wherein it is desired to set up a lighting display that there will be access to the Internet or some other communication medium for connecting to the device on which the program is authored. In addition, it should be appreciated that it may be desirable for an organization to have only a single device with the capability of authoring a lighting program (i.e., having a display, relevant software, etc.), on which numerous different lighting programs can be authored. If playback of the lighting program were limited to the device on which it was authored, then only one of potentially numerous programs authored on a particular device could be played back at a time, which would severely restrict the usefulness of the system.

Figure 8:
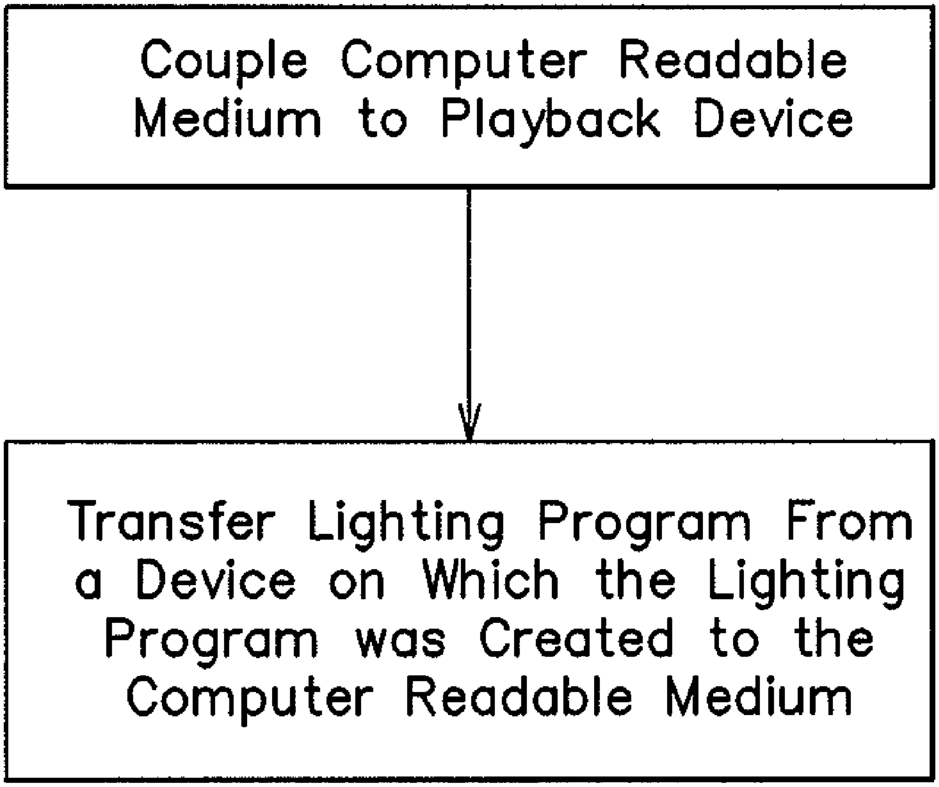
FIG. 8 illustrates a method for coupling a computer readable medium to a playback device and transferring a lighting program to the computer readable medium.
Figure 3:
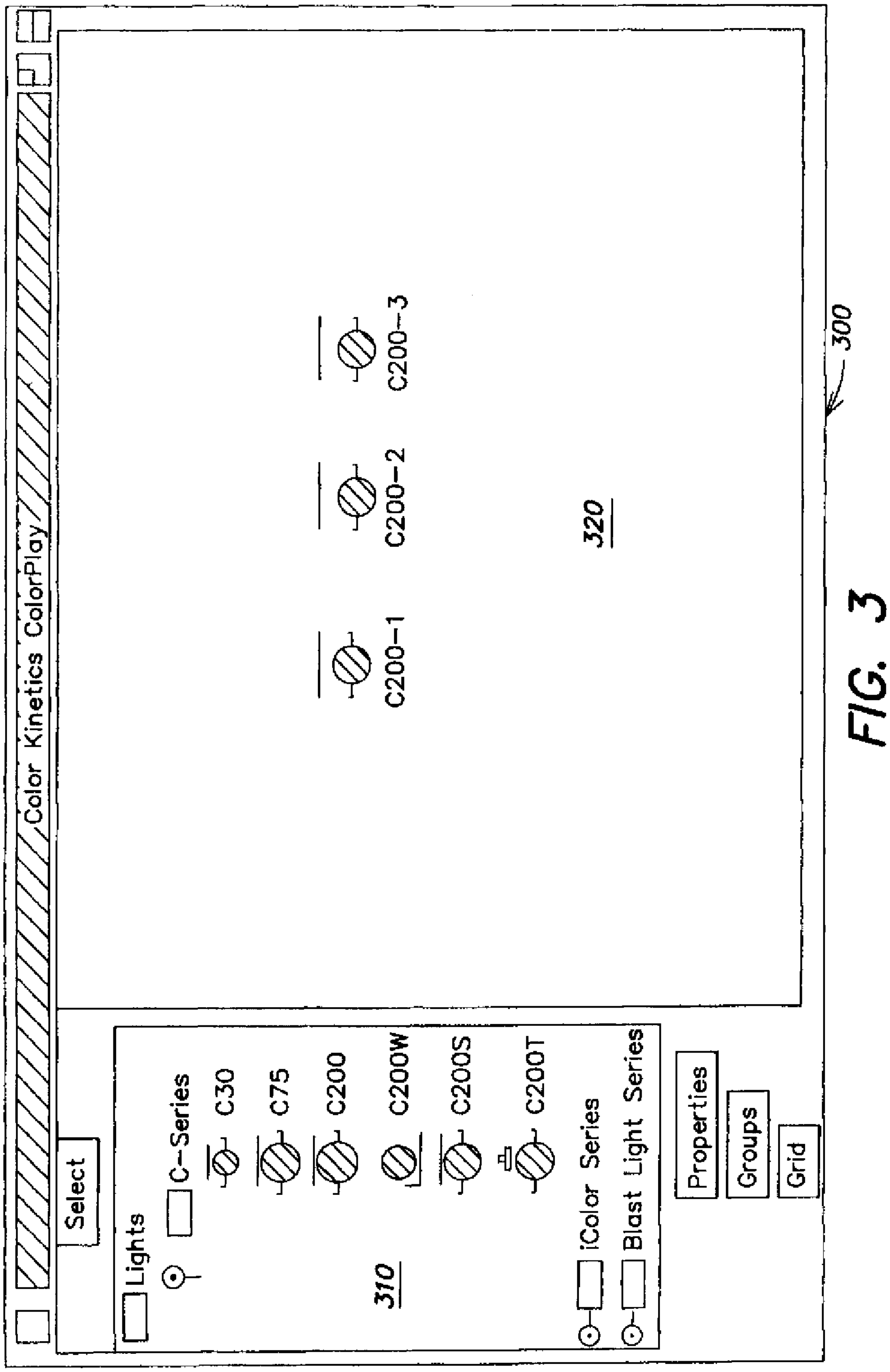
Figure 4:
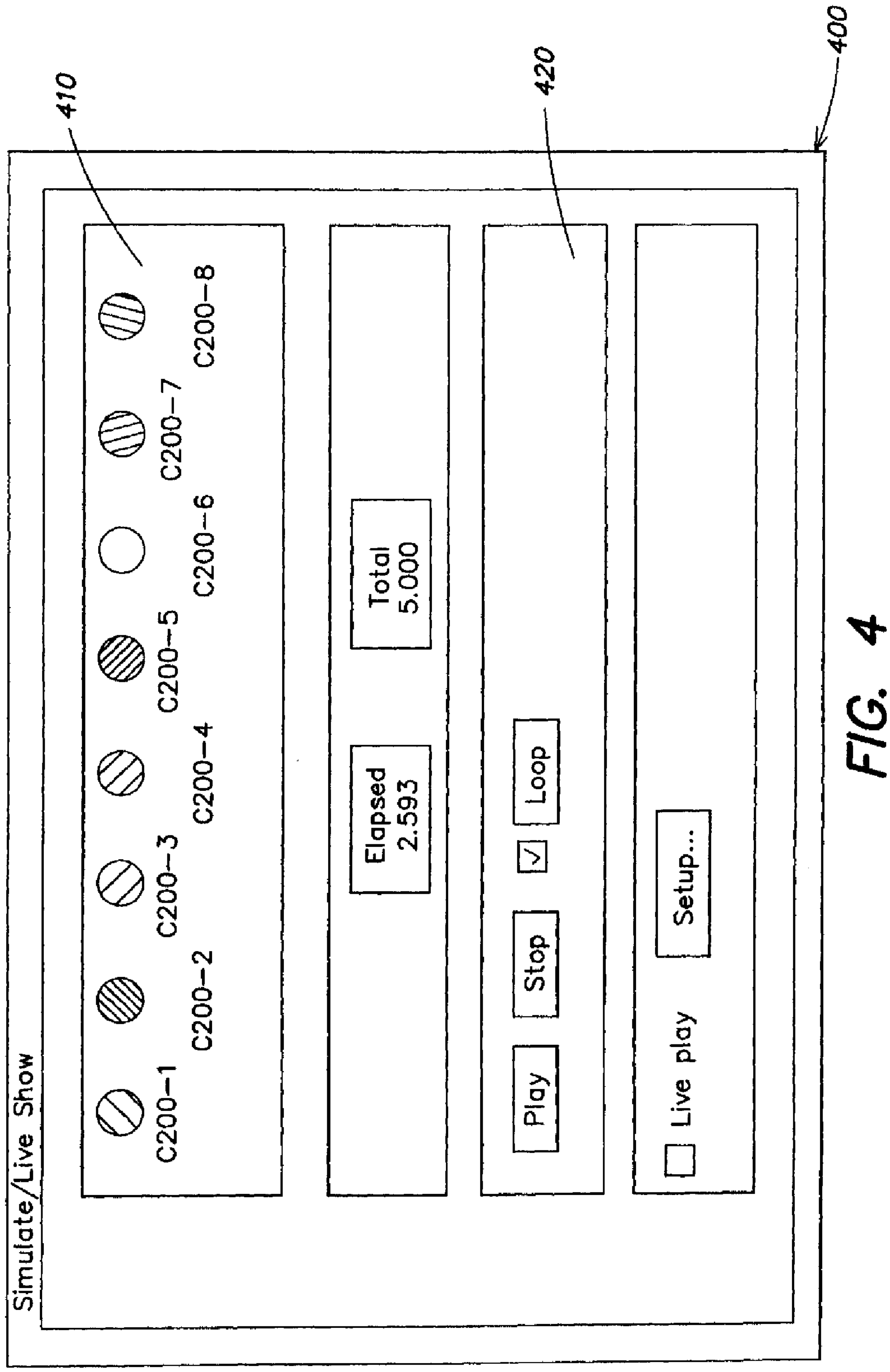
Figure 5:
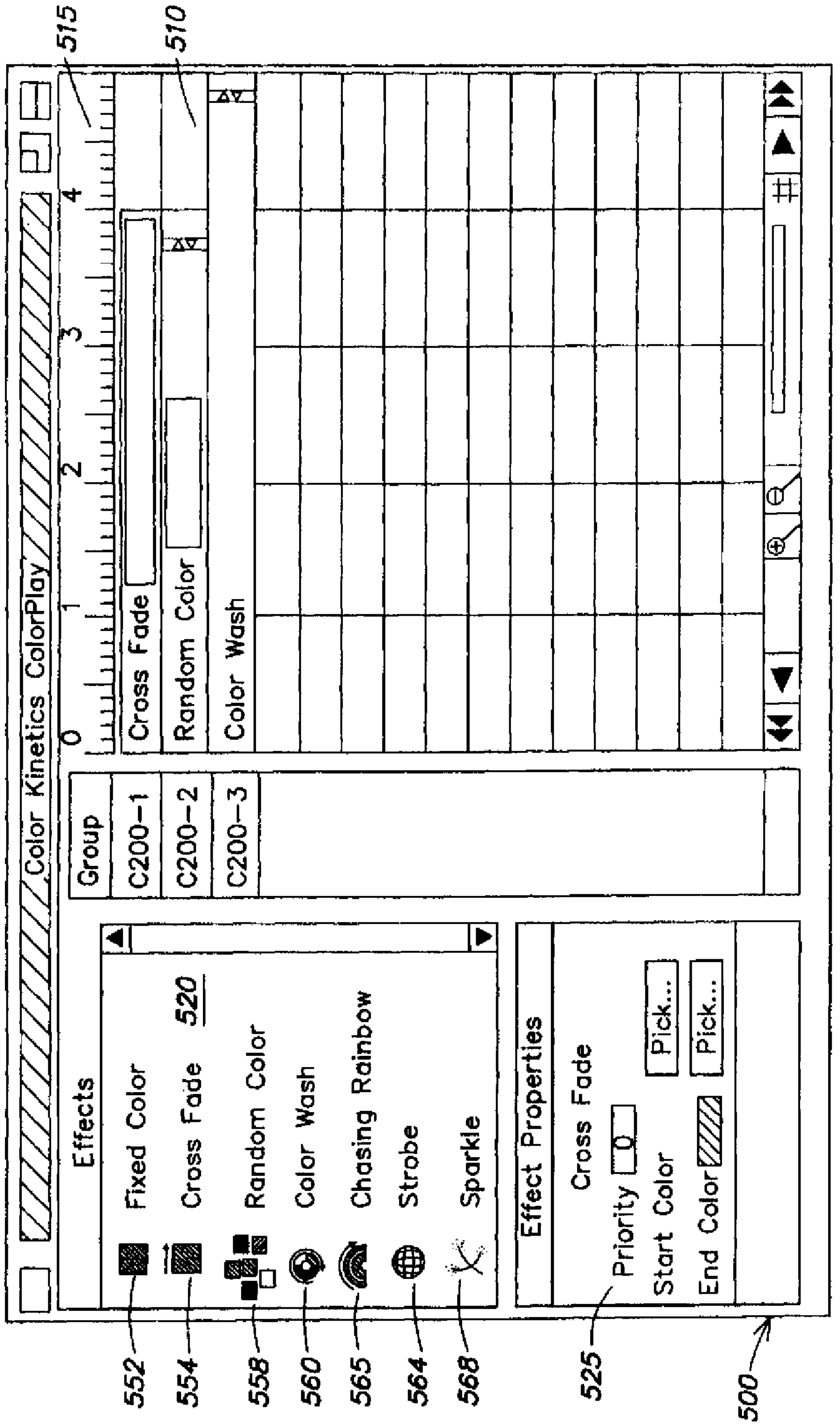

In view of the foregoing, one embodiment of the present invention is directed to a system in which lighting programs are authored on one device as described above, and then transferred to a different device which plays back the lighting program and controls a lighting display. In accordance with one illustrative embodiment of the invention, the separate playback device can be a general purpose computer, with software loaded thereon to enable it to playback the lighting program. The transfer of the lighting program from the device on which it is authored to the device on which it is played back can be accomplished in any of numerous ways, such as by connection over a communication medium (e.g., via email over the Internet), or by loading the lighting program onto a portable computer readable medium (e.g., a disk, flash memory or CD) and physically transporting the medium between the two devices. FIG. 8 shows one exemplary method for transferring the lighting program.

In accordance with an alternate embodiment of the invention, Applicants have appreciated that the device used to playback a lighting program need not have all of the functionality and capability of the device used in authoring the program (e.g., it need not include a video monitor, a robust user interface, etc.). Furthermore, Applicants have appreciated that in many instances, it would be desirable to provide a relatively small and inexpensive device to perform the playback function, so that the device can be portable and such that if there are multiple instances of lighting systems on which a program is to be played back, separate devices can be used to control the playback on each of the lighting systems, to increase flexibility.

In view of the foregoing, one embodiment of the present invention is directed to a device, for playing back a lighting program, that includes less hardware and is less expensive than a more complex system that permits authoring of the lighting program. For example, the device need not include a lot of the functionality found in a general purpose computer, such as a full size display, a full alphanumeric keyboard, an operating system that enables processing of multiple applications simultaneously, etc. The playback device can take any of numerous forms, as the present invention is not limited to any particular implementation.

Figure 6:
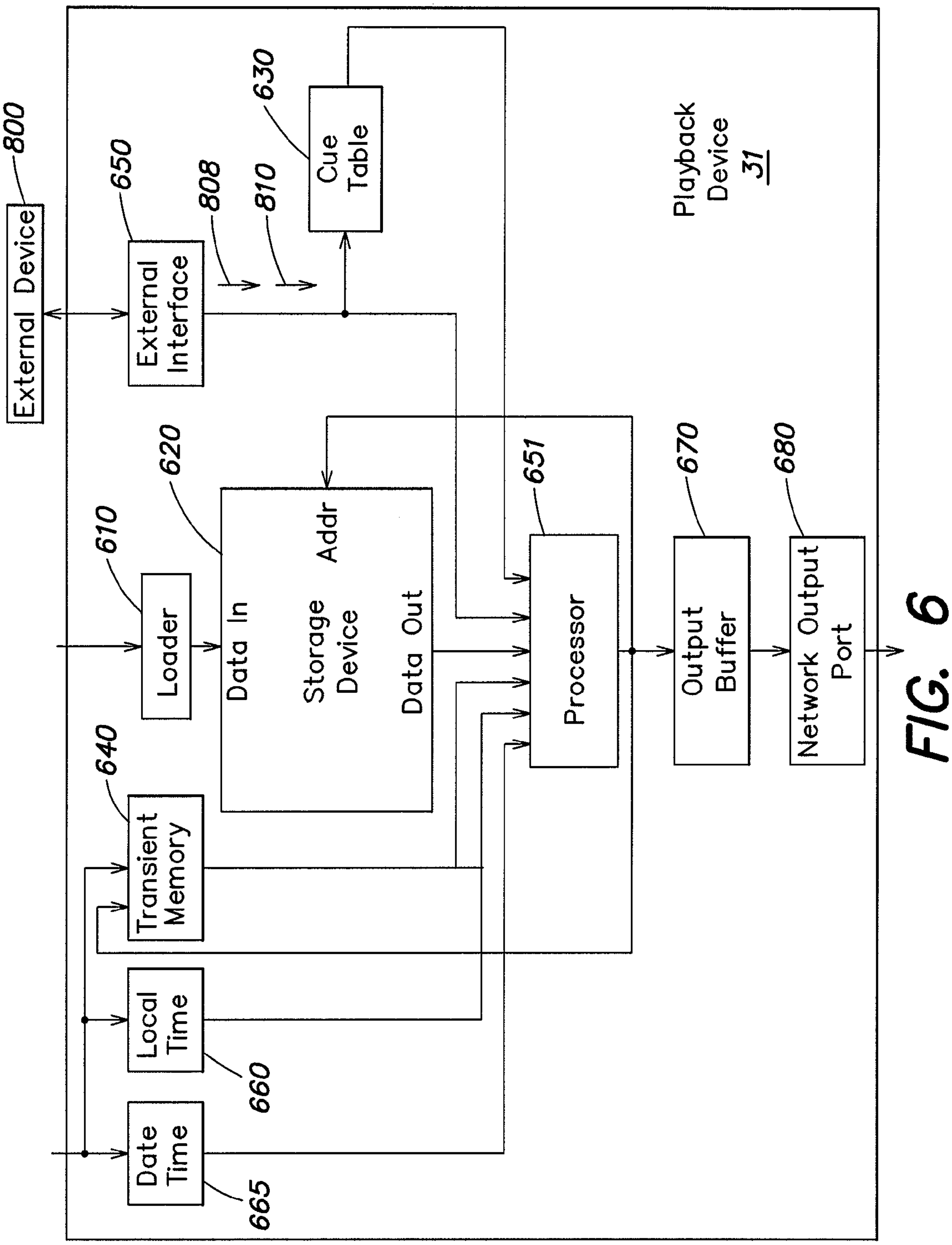
FIG. 6 shows one embodiment of an apparatus for executing a lighting sequence in accordance with another embodiment of the invention.

One illustrative implementation of a playback device 31 is shown in FIG. 6. The playback device 31 may employ any suitable loader interface 610 for receiving a lighting program 20, e.g., an interface for reading a lighting program 20 from a storage medium such as a compact disk, diskette, magnetic tape, smart card, or other device, or an interface for receiving a transmission from another system, such as a serial port, USB (universal serial bus) port, parallel port, IR receiver, or other connection for receiving a lighting program 20. In certain embodiments, the lighting program 20 may be transmitted over networks (e.g., the Internet).

The components on the playback device 31 can be powered in any of numerous ways, including through the provision of a power source (e.g., a battery) within the playback device, or through the provision of an interface for receiving a power cord compatible with a standard electrical outlet. However, in accordance with one illustrative embodiment of the present invention, the playback device 31 is provided with neither an onboard power source nor an interface for a standard electrical outlet. Thus, in accordance with one illustrative embodiment of the invention, the interfaces for connecting the playback device 31 to both a device that authors a lighting program (e.g., a general purpose computer with software loaded thereon to perform the above-described functions) and for connecting with one or more lighting units 40 provide an interface that enables not only the transfer of data or other communication signals, but also sufficient electrical current to power the components within the playback device 31, thereby eliminating the need for a separate power interface. The present invention is not limited to the use of any particular type of interface. One example of a suitable interface that provides both communication and power is a USB port.

The playback device 31 may begin execution of a lighting sequence 20 upon the loading the lighting sequence 20 into the device 31, upon receiving a command or signal from a user interface, another device, or a sensor; at a specified time; or upon any other suitable condition. The condition for initiation may be included in the lighting sequence 20, or may be determined by the configuration of the playback device 31. Additionally, in certain embodiments, the playback device 31 may begin execution of a lighting sequence 20 at a starting point other than the beginning of the lighting sequence 20. For example, playback device 31 may, upon receiving a request from the user, execute a lighting sequence 20 starting from a point three minutes from the beginning of the sequence, or at any other specified point, e.g., from the fifth effect, etc. In one embodiment, the playback device 31 may, upon receiving a signal from a user, a device or sensor, pause the playback, and, upon receiving a suitable signal, resume playback from the point of pausing. The playback device 31 may continue to execute the lighting sequence 20 until the sequence terminates, or it may repeatedly replay the sequence until a command or signal is received from a user, device or sensor, until a specified time, or until any other suitable condition.

The playback device 31 may include a storage device 620, such as a memory unit, database, or other suitable module (e.g., a removable Flash memory), for storing lighting information. In accordance with one embodiment of the present invention, the storage device 620 is formed as a non-volatile memory device, such that once information is stored thereon, the information is maintained, even when no power is provided to the playback device 31. The lighting information may take any of many forms. For example, the storage device 620 may store a plurality of effects and instructions for converting those effects into a data format or protocol, such as DMX, RS-485, or RS-232, suitable for controlling a plurality of lighting units 40. The storage device 620 may be preconfigured for a set of stock effects, may receive effects and instructions in the form of an authored lighting sequence 20, or the storage device 620 may include a preconfigured set of stock effects which can be supplemented by additional effects provided in an authored lighting sequence 20. Preconfiguring the storage device 620 with a set of stock effects permits a reduction in the memory required to store a lighting sequence 20, because the lighting sequence 20 may omit conversion instructions for effects preconfigured into the playback device 31. In embodiments wherein the lighting sequence 20 includes stock effects designed by the author, suitable instructions may be included in lighting sequence 20 and stored in storage device 620, e.g., upon loading or execution of the lighting sequence 20. It should be appreciated that the information stored within the storage device 620 need not be stored in the form of lighting effects and instructions for converting those effects into a data format suitable for controlling a plurality of light units, as such a conversion can be performed prior to storing the information in the storage device 620.

As mentioned above, in one embodiment of the present invention, a lighting program 806*a* (FIG. 7) may be transformed and stored on a storage medium (e.g., storage device 620) in a format which represents the final data stream suitable for directly controlling lighting units or other devices. It should be appreciated that during the execution of a lighting program, the lighting units 40 will go through a number of different states, in that the changing of an effect, or parameter therefore, for any of the lighting units will result in a different state for the lighting units taken as a whole. When a lighting program is authored, a playback rate can be established, and the program can be stored in the storage medium with a frame corresponding to each update period established by the playback rate. A frame has sufficient information to establish a full state of the lighting units 40 controlled by the program. Thus, in accordance with one embodiment of the present invention, the storage medium stores the lighting program in a format so that there is a frame 802*a-n* corresponding to each of the states of the lighting units. This is to be contrasted with other types of lighting unit playback devices, which do not store such complete frames, but rather, store information that enables the playback device to interpolate and thereby generate the frames necessary to place the lighting units in each of the plurality of states to be achieved. The embodiment of the present invention that stores a specific frame for each of the plurality of states is advantageous, in that it provides more flexibility in programming the lighting program. However, it should be appreciated that other embodiments of the present invention are not limited in this respect, and they can transfer data to and store it within the storage medium in different formats.

In one embodiment, the playback device 31 may include an external interface 650 whereby the playback device 31 can receive external signals from one or more external devices, such as external device 800, useful for impacting (e.g., modifying) the execution or output of one or more stored lighting sequences 20. For example, the external interface 650 may include a user interface, which may in turn include switches, buttons, dials, sliders, a console, a keyboard, a speech recognition system, or any other device, such as a sensor, whereby a command or signal can be provided to the playback device 31 to otherwise influence the execution or output of the lighting sequence 20. The external devices may be coupled to the playback device 31 via any suitable technique, including a direct wire connection or via RF or some other type of wireless connection. The manner in which an external command or signal can influence execution or output of the lighting sequence 20 can be accomplished in any of numerous ways, as the present invention is not limited to any particular implementation. In the illustrative embodiment shown in FIG. 6, the playback device 31 is provided with a processor 651 that receives the output of the storage device 620, and can act thereon to influence the played back output of the lighting sequence 20 stored within the storage device 620. In the embodiment shown, the external interface 650 is directly coupled to the processor 651, such that the processor can examine any external signals and commands and make decisions based thereon to influence the played back output of the lighting sequence 20. As mentioned elsewhere herein, there are numerous types of external commands, cues and signals that can be provided and also numerous ways in which they can influence the execution of a lighting sequence, such that the present invention is not limited to any particular commands, cues or signals, nor any particular manner of influencing the playback of a lighting sequence.

In addition to influencing the played back output of a lighting sequence 20, an external command, cue or signal can also influence the execution order of a lighting sequence, by causing an alteration in the execution order of a lighting sequence, for example, by branching to places out-of-line in a particular lighting sequence or by branching out of the lighting sequence altogether. Thus, as shown in FIG. 6, commands, cues or signals received by the external interface 650 can be provided directly to the processor 651, which can then alter the playback sequence of a particular lighting sequence, go to the execution of stock effects, switch between lighting sequences, or take any other type of action relating to the execution order of lighting sequences from the storage device 620.

In the embodiment shown in FIG. 6, the playback device 31 further includes chronometers to provide timing references to the processor 651. In the embodiment shown, two such chronometers are employed, a first being a local time module 660, which functions as a counter for measuring time from a predetermined starting point, for example, when the playback device 31 is turned on or a point in time when the counter is reset. In addition, a date time module 665 is provided which calculates the current date and time. In the embodiment shown, an output from each of the modules 660, 665 is provided to the processor 651, which enables the processor 651 to include timing based information in making decisions impacting any of numerous aspects discussed above relating to the playback output and order of lighting sequences from the storage device 620, including but not limited to the rate at which a lighting sequence is being played back, the intensity or any other parameter relating to a lighting sequence being played back, switching between lighting sequences based upon a particular timing event, etc. In the embodiment shown in FIG. 6, each of the timing modules 660, 665 can receive communications from an external source, for example, to reset the timing modules, to load a value therein, etc. It should be appreciated that a dedicated input port for the timing modules 660, 665 need not be employed, as they can alternatively receive communications from external sources via other paths, e.g., from the external interface 650, from the loader 610, from an output of the processor 651, etc., as the embodiment of the present invention that employs such timing modules is not limited to any particular implementation. In addition, while the timing modules, 660, 665 provide the advantages described above, it should be appreciated that they are optional, as some embodiments of the present invention need not employ any timing modules at all.

As discussed above, in one embodiment of the present invention, external signals received, via external interface 650, can be provided directly to the processor 651, which can then take any of the various actions described above based on the external signals, e.g., altering the rate at which lighting sequences are played back, branching within or between lighting sequences, altering brightness or other parameters of lighting sequences being played back, etc. In the embodiment of the invention shown in FIG. 6, a cue table 630 is also provided to compare or interpret external signals received via the external interface 650, and to provide information related thereto to the processor 651. The cue table 630 may contain information relating to various inputs or conditions received by the external interface 650, as designated by the author of a lighting sequence 20, to effect the execution or output of the lighting sequence. The cue table can include a list of if/then statements, other types of boolean expressions, or any other types of functions to interpret actions to be taken during execution of the lighting program based upon the information received from various inputs or conditions. Thus, if the playback device 31 compares an input to the cue table 630 and determines that a condition has been satisfied or a designated signal has been received, the playback device 31 may alter the execution or output of the lighting sequence 20 as indicated by the program, based upon information that is stored within the cue table 630 and provided to the processor 651. In the embodiment shown in FIG. 6, the signals received by the external interface 650 can be provided either directly to the processor 651 or can be interpreted via the cue table 630. It should be appreciated that other configurations are possible, as the present invention is not limited to the particular implementation shown in FIG. 6. For example, the signals received by the external interface 650 can, in another embodiment of the invention, not be sourced directly to the processor 651, such that they can always be interpreted via the cue table 630. Alternatively, in another embodiment of the invention, the cue table 630 can be eliminated.

In certain embodiments, the playback device 31 may respond to external signals in ways that are not determined by the contents and instructions of the lighting sequence 20. For example, the external interface 650 may include a dial, slider, or other feature by which a user may cause a signal 808 to be transmitted that alters the rate of progression of the lighting sequence 20, e.g., by changing the speed of the local time counter 660, or by altering the interpretation of this counter by the playback device 31. Similarly, the external interface 650 may include a feature by which a user may cause a signal 810 to be transmitted that adjusts the intensity, color, or other characteristic of the output. In certain embodiments, a lighting sequence 20 may include instructions to receive a parameter for an effect from a feature or other user interface on the external interface 650, permitting user control over only specific effects during playback, rather than over all of the effects output to the system of lighting units as a whole.

It should be appreciated that the specific types of external interfaces described above, as well as their specific impacts on a lighting sequence, are provided merely for illustrative purposes, as numerous other types of interfaces and impacts on a lighting sequence are possible. Thus, the embodiment of the present invention related to the use of an external interface to impact the playing back of the lighting sequence is not limited to the specific examples described above. Furthermore, although this embodiment of the present invention includes a number of advantages as described above, it should be appreciated that an external interface is not a requirement of other aspects of the present invention, as various embodiments of the present invention need not employ an external interface at all.

The playback device 31 may also include a transient memory 640. The transient memory 640 may store temporary information, such as the current state of each lighting unit under its control, which may be useful as a reference for the execution of the lighting sequence 20. For example, as described above, some effects may use the output of another effect to define a parameter; such effects may retrieve the output of the other effect as it is stored in the transient memory 640. It should be appreciated that the embodiment of the present invention that employs a transient memory is not limited to using it in this manner, as numerous other uses may be possible (e.g., as a scratch pad memory for the processor 651). Furthermore, various embodiments of the present invention can be implemented without using any transient memory at all.

The playback device 31 may send the data created by the execution of a lighting sequence 20 to the lighting units 40 in any of numerous ways, as the present invention is not limited to any particular technique. In the embodiment shown in FIG. 6, the playback device 31 transmits such data to the lighting units 40 via a network output port 680, which can be any of numerous types of interfaces capable of communicating with the lighting units 40. For example, the network output 680 can be an interface for connection to the lighting units via wires or cables, via an IR, RF or other wireless transmission, over a computer network, any other suitable method of data transfer, or via any combination of techniques capable of controlling the lighting units 40 and/or any associated other devices. In the embodiments shown, the information read from the storage device 620 is passed through an output buffer 670 that is then coupled to the network output port 680. However, it should be appreciated that the present invention is not limited in this respect, as no output buffer need be used in other embodiments.

In one embodiment of the present invention, the storage device 620 can be loaded with only a single lighting sequence 20 at any particular time, such that the playback device 31 is programmed to only play one particular lighting sequence 20. In accordance with this embodiment of the present invention, execution of the single lighting sequence 20 can begin immediately upon the playback device 31 receiving power, and the lighting sequence 20 can be programmed to execute a set number of times (e.g., once or multiple times), or it can be programmed to continuously loop through multiple executions.

In an alternate embodiment of the present invention, the playback device 31 is arranged to enable multiple lighting sequences 20 to be stored within the storage device 620. In accordance with this embodiment of the present invention, some user interface is provided to enable a user to select which of the multiple lighting sequences 20 is to be played back at any particular time. The present invention is not limited to the use of any particular type of user interface in this regard, as numerous techniques can be employed. In one embodiment of the present invention, it is desirable to minimize the size, cost and complexity of the playback device 31. In accordance with that embodiment of the present invention, a simple button or switch can be employed that, when toggled, switches between the multiple lighting sequences 20 stored within the storage device 620.

In the embodiment shown in FIG. 6, separate data paths are shown for providing input to the timing modules 660, 665, the loader 610, the external interface 650 and the network output port 680. It should be appreciated that numerous other implementations are possible that can reduce the number of input/output ports on the playback device 31. For example, a single data path can be shared for providing data to the timing modules 660, 665 and the loader 610. In addition, a bi-directional input/output interface can be used so that the data path for loading the storage device 620 can be shared with the data path for providing an output to the plurality of lighting units. In addition, to reduce the number of input/output ports on the device, serial (rather than parallel) interfaces can be employed. Thus, as should be appreciated from the foregoing, numerous techniques are possible for configuring the input/output ports of the playback device 31, as the present invention is not limited to any particular implementation technique.

In certain embodiments, the playback device 31 may not communicate directly with the lighting units, but may instead communicate with one or more subcontrollers which, in turn, control the lighting units or another level of subcontrollers, etc. The use of subcontrollers permits distributive allocation of computational requirements. An example of such a system which uses this sort of distributional scheme is disclosed in U.S. Pat. No. 5,769,527 to Taylor, described therein as a "master/slave" control system. Communication between the various levels may be unidirectional, wherein the playback device 31 provides instructions or subroutines to be executed by the subcontrollers, or bidirectional, where subcontrollers relay information back to the controller 30, for example, to provide information useful for effects which rely on the output of other effects as described above, for synchronization, or for other purposes.

As discussed above, the playback device 31 architecture permits effects to be based on external environmental conditions or other input. An effect is a predetermined output involving one or more lighting units. For example, fixed color, color wash, and rainbow wash are all types of effects. An effect may be further defined by one or more parameters, which specify, for example, lights to control, colors to use, speed of the effect, or other aspects of an effect. The environment refers to any external information that may be used as an input to modify or control an effect or the playback of one or more lighting sequences, such as the current time or external inputs such as switches, buttons, or other transducers capable of generating control signals, or events generated by other software or effects. Finally, an effect may contain one or more states, so that the effect can retain information over the course of time. A combination of the state, the environment, and the parameters may be used to fully define the output of an effect at any moment in time, and over the passage of time In addition, the playback device 31 may implement effect priorities. For example, different effects may be assigned to the same lights. By utilizing a priority scheme, differing weights can be assigned to effects assigned to the same lights. For example, in one embodiment only the highest priority effect will determine the light output. When multiple effects control a light at the same priority, the final output may be an average or other combination of the effect outputs.

Figure 7:
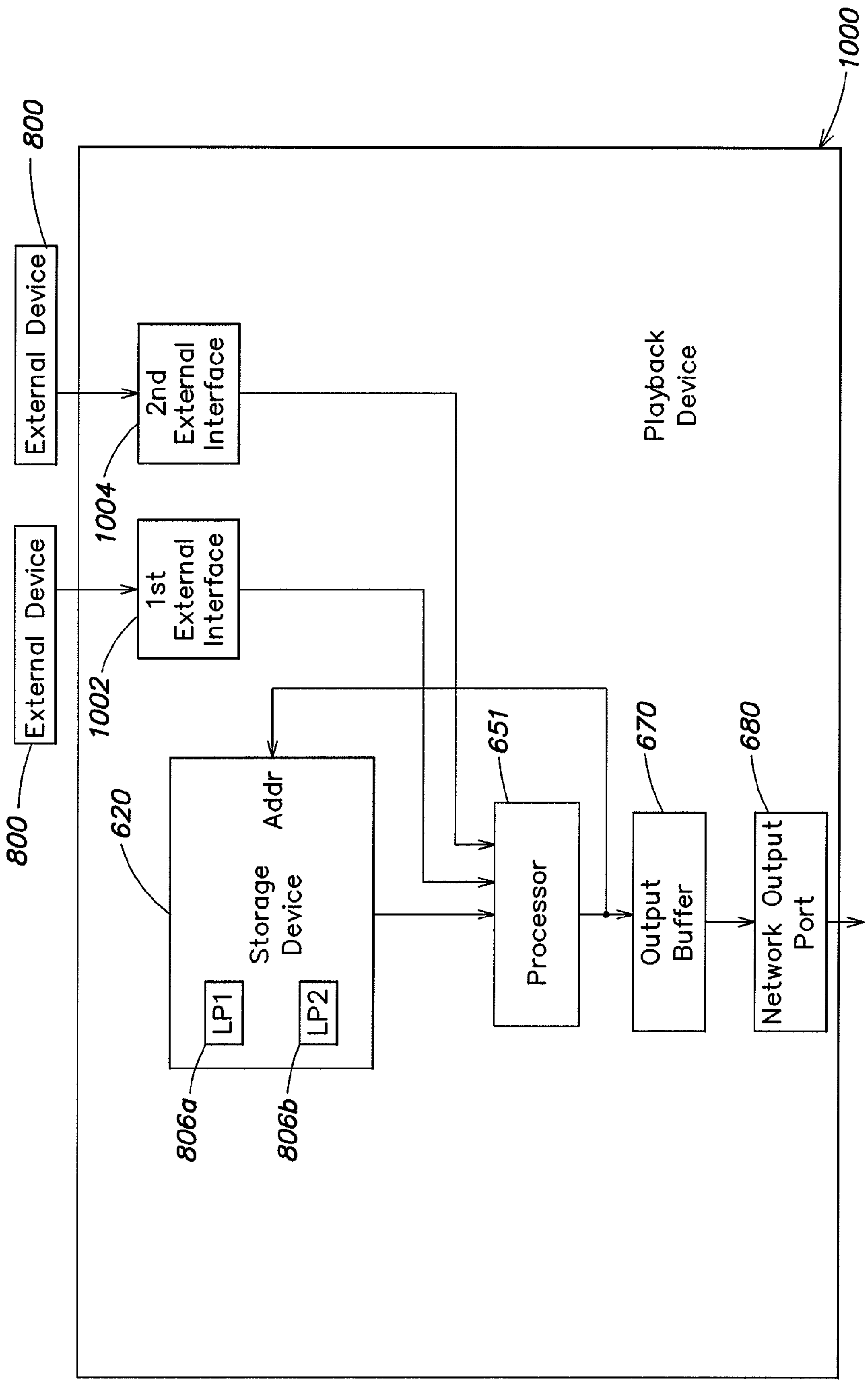
FIG. 7 shows a block diagram of an alternate embodiment of the present invention directed to an apparatus for executing a lighting sequence.

An alternate embodiment of the present invention is directed to a playback device 1000, as shown in FIG. 7, that differs from the playback device 31 described above in that it does not include a loader 610 for loading lighting programs into the storage device 620. In accordance with this illustrative embodiment of the present invention, the playback device 1000 is not loadable with customized lighting programs via the user, but rather can be provided with a storage device 620 having one or more pre-installed lighting programs already loaded thereon, such that the lighting programs stored in the playback device 1000 are not modifiable by the user.

In the embodiment shown in FIG. 7, the playback device 1000 does not include a cue table 630, timing modules 665 or 660, or a transient memory 640. However, it should be appreciated that any or all of these features can alternatively be provided, in much the same manner as described above in connection with the playback device 31 of FIG. 6.

In one embodiment of the playback device 1000, the storage device 620 stores multiple lighting programs (e.g., lighting programs 806*a* and 806*b*), in much the same manner as discussed above in connection with some embodiments of the playback device 31 in FIG. 6. In accordance with this embodiment, a first external interface 1002 is provided to receive an externally generated signal to select which lighting program stored within the storage device 620 is to be played back by the playback device 1000. The first external interface 1002 is compatible with any of numerous types of user interfaces to enable selection of a particular lighting program to be played back. For example, in accordance with one illustrative embodiment of the present invention, a push button, toggle switch or other type of device can be used that when activated by the user, causes the processor 651 to select a next lighting program for playback, so that by repeatedly toggling the input device, a user can step through all of the lighting programs stored in the storage device 620 to select a desired program for execution.

In the embodiment shown in FIG. 7, the playback device 1000 further includes a second external interface 1004 that is compatible with another user interface to enable the user to vary a parameter of a lighting program being played back by the playback device 1000. The parameter being varied can apply to all of the lighting effects in a lighting program (e.g., can influence the playback speed or intensity of an entire lighting program being played back) or can relate to only a subset (including only a single effect) of the lighting effects. Any of numerous types of lighting effect or parameter changes can be accomplished, as described above in connection with other embodiments of the present invention. Similarly, the user interface compatible with the second external interface 1004 can take any of numerous forms, as this embodiment of the present invention is not limited to the use of any particular type of interface. For example, in one embodiment of the present invention the user interface may be capable of generating a plurality of different signals, which can be used to vary a parameter of the lighting program being played back, such as the playback speed, intensity of illumination, color of a particular portion of a lighting program (including adjustments in hue, saturation and/or intensity) or any other parameter. For example, the second external interface may provide a variable digital signal to the processor 651 depending on the setting or position of the user interface. Alternatively, the user interface may supply an analog signal to the second external interface 1004, which can then convert the analog signal to a digital signal for communication to the processor 651.

While the embodiment of the present invention shown in FIG. 7 includes separate first and second external interfaces to perform the functions of selecting a particular lighting program to be played back and varying a lighting effect or parameter thereof, it should be appreciated that the present invention is not limited in this respect, and that other arrangements are possible, such as employing a single user interface to perform both of these functions.

As indicated above, in an alternate embodiment of the present invention, a cue table 630 can be provided to interpret the information received from the first and second external interfaces 1002, 1004, rather than providing their outputs directly to the processor 651.

A lighting sequence as described above may be implemented using one or more subroutines, such as a Java program fragment. Such subroutines may be compiled in an intermediate format, such as by using an available Java compiler to compile the program as byte codes. In such a byte code format, the fragment may be called a sequence. A sequence may be interpreted or executed by the playback device 31. The sequence is not a stand-alone program, and adheres to a defined format, such as an instantiation of an object from a class, that the playback device 31 may use to generate effects. When downloaded into the playback device 31 (via serial port, infrared port, smart card, or some other interface), the playback device 31 interprets the sequence, executing portions based on time or input stimuli.

In one embodiment, a building block for producing a show is an effect object. The effect object includes instructions for producing one specific effect, such as color wash, cross fade, or fixed color, based on initial parameters (such as which lights to control, start color, wash period, etc.) and inputs (such as time, environmental conditions, or results from other effect objects). The sequence contains all of the information to generate every effect object for the show. The playback device 31 instantiates all of the effect objects one time when the show is started, then periodically sequentially activates each one. Based on the state of the entire system, each effect object can programmatically decide if and how to change the lights it is controlling.

The run-time environment software running on the playback device 31 may be referred to as a conductor. The conductor may be responsible for downloading sequences, building and maintaining a list of effect object instances, managing the interface to external inputs and outputs (including DMX), managing the time clock, and periodically invoking each effect object. The conductor also maintains a memory (e.g., transient memory 640) that objects can use to communicate with each other.

A channel may be a single data byte at a particular location in the DMX universe. A frame may be all of the channels in the universe. The number of channels in the universe is specified when the class is instantiated.

When an effect object sets the data for a particular channel it may also assign that data a priority. The priorities can be interpreted in any of numerous ways. For example, if the priority is greater than the priority of the last data set for that channel, then the new data may supersede the old data; if the priority is lesser, then the old value may be retained; and if the priorities are equal, then the new data value may be added to a running total and a counter for that channel may be incremented. When the frame is sent, the sum of the data values for each channel may be divided by the channel counter to produce an average value for the highest priority data. Of course, other ways of responding to established priorities are possible.

After each frame has been sent the channel priorities may all be reset to zero. The to-be-sent data may be retained, so if no new data is written for a given channel it will maintain its last value, and also copied to a buffer in case any effect objects are interested.

The conductor is the run-time component of the playback device 31 that unites the various data and input elements. The conductor may download sequences, manage the user interface, manage the time clock and other external inputs, and sequence through the active effect objects.

The technique for downloading the sequence file into the conductor can vary depending on the hardware and transport mechanism. In one embodiment, the sequence object and various required classes may be loaded into memory, along with a reference to the sequence object.

In one embodiment, more than one sequence object may be loaded into the conductor, and only one sequence may be active. The conductor can activate a sequence based on external inputs, such as the user interface or the time of day.

The above-discussed embodiments of the playback device 31 can be implemented in any of numerous ways. Thus, while a single processor 651 is shown in the embodiment of FIG. 6 to perform each of the functions described above, it should be appreciated that the present invention is not limited in this respect, and that the various functions described above as being performed by the processor 651 can be distributed among two or more processors or controllers, such that in one embodiment there is a dedicated controller to carry out each of the functions of the processor 651 described above.

It should be appreciated that any single component or collection of multiple components of the playback device that perform the functions described above can be generically considered as one or more controllers that control the above-discussed functions. The one or more controllers can be implemented in numerous ways, such as with dedicated hardware, or using a processor (as described in the embodiment of FIG. 6) that is programmed to perform the functions recited above. In this respect, it should be appreciated that one implementation of the present invention comprises at least one computer readable medium (e.g., a computer memory, a floppy disk, a compact disk, a tape, etc.) encoded with a computer program that, when executed on a processor, performs the above-discussed functions of the present invention. The computer readable medium can be transportable such that the program stored thereon can be loaded onto any device having a processor to implement the aspects of the present invention discussed above. In addition, it should be appreciated that the reference to a computer program that, when executed, performs the above-discussed functions is not limited to an application program, but rather is used herein in the generic sense to reference any type of computer code (e.g., software or microcode) that can be employed to program a processor to implement the above-discussed aspects of the present invention.

Having described several embodiments of the invention in detail, numerous modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A method for executing a lighting program to control a plurality of lights, the lighting program defining a sequence of states for the plurality of lights, the method comprising acts of:

(A) transferring the lighting program from a first device on which the lighting program was created to at least one computer readable medium and storing the lighting program on the computer readable medium, the lighting program being transferred in a data format having a plurality of frames, each one of the plurality of frames corresponding to one state in the sequence of states for the plurality of lights, and the lighting program being stored by storing a specific frame for each of the states, the data format representing a final data stream for directly controlling the plurality of lights without format conversion;

(B) coupling the computer readable medium to a second device that is not coupled to the first device;

(C) coupling the second device to the plurality of lights; and (D) executing the lighting program on the second device by reading the plurality of frames from the computer readable medium and passing the final data stream from the second device to the plurality of lights to control the plurality of lights to execute the sequence.

2. The method of claim 1, wherein the at least one computer readable medium comprises a first computer readable medium, and wherein the act (A) includes an act of transferring the lighting program from the first device to the first computer readable medium via a second computer readable medium and storing the lighting program on the second computer readable medium, so that the lighting program is transferred from the first device to the second computer readable medium and from the second computer readable medium to the first computer readable medium and stored on the first computer readable medium.

3. The method of claim 1, wherein the lighting program is a first lighting program, and wherein the method further includes acts of:

(E) transferring a second lighting program in the data format having the plurality of frames to the at least one computer readable medium so that the computer readable medium simultaneously stores both the first and second lighting programs; and (F) executing the second lighting program on the second device by reading the second lighting program from the computer readable medium to control the plurality of lights.

4. The method of claim 3, wherein the act (E) includes an act of transferring the second lighting program to at least one computer readable medium from the first device.

5. The method of claim 3, further including an act of, during execution of the first lighting program in act (D), switching to execution of the second lighting program in act (F) in response to an input received at the second device from an external device.

6. The method of claim 3, further including an act of, during execution of the first lighting program in act (D), switching to execution of the second lighting program in act (F) in response to an input received from a user at the second device.

7. The method of claim 3, further including an act of, during execution of the first lighting program in act (D), switching to execution of the second lighting program in act (F) in response to an input received at the second device from a sensor.

8. The method of claim 1, further including an act of, during execution of the lighting program in act (D), changing an effect assigned in the lighting program to at least one of the plurality of lights from a programmed effect to a new effect in response to an input received at the second device from an external device.

9. The method of claim 1, further including an act of, during execution of the lighting program in act (D), changing a parameter of at least one effect assigned, in the lighting program, to at least one of the plurality of lights from a programmed parameter to a new parameter in response to an input received at the second device from an external device.

10. The method of claim 1, further including an act of, during execution of the lighting program in act (D), changing a speed at which the lighting program is executed from a programmed speed to a new speed in response to an input received at the second device from an external device.

11. The method of claim 1, further including an act of, during execution of the lighting program in act (D), changing a speed at which the lighting program is executed from a programmed speed to a new speed in response to a sensor input received at the second device.

12. The method of claim 1, further including an act of, during execution of the lighting program in act (D), changing an effect assigned in the lighting program to at least one of the plurality of lights from a programmed effect to a new effect in response to a sensor input received at the second device.

13. The method of claim 1, further including an act of, during execution of the lighting program in act (D), changing a parameter of at least one effect assigned, in the lighting program, to at least one of the plurality of lights from a programmed parameter to a new parameter in response to a sensor input received at the second device.

14. The method of claim 1, wherein the act (B) includes an act of coupling the computer readable medium to a display-less second device.

15. The method of claim 1, wherein the act (B) is performed before the act (A).

16. The method of claim 1, wherein the act (C) includes an act of disposing the computer readable medium within the second device.

17. The method of claim 1, wherein the act (A) includes an act of transferring a device controlling program capable of directly controlling at least one non-light device in addition to the plurality of lights; and wherein the act (D) includes reading the device controlling program from the computer readable medium and passing a control data stream to the at least one non-light device to control the at least one non-light device.

18. The method of claim 1, further including an act of, during execution of the lighting program in act (D), changing an effect assigned in the lighting program to at least one of the plurality of lights from a programmed effect to a new effect in response to a timing device coupled to the second device.

19. The method of claim 1, further including an act of, during execution of the lighting program in act (D), changing an effect assigned in the lighting program to at least one of the plurality of lights from a programmed effect to a new effect in response to a timing device disposed within the second device.

20. The method of claim 1, further including an act of, during execution of the lighting program in act (D), changing a parameter of at least one effect assigned, in the lighting program, to at least one of the plurality of lights from a programmed parameter to a new parameter in response to a timing device coupled to the second device.

21. The method of claim 1, further including an act of, during execution of the lighting program in act (D), changing a parameter of at least one effect assigned, in the lighting program, to at least one of the plurality of lights from a programmed parameter to a new parameter in response to a timing device disposed within the second device.

22. The method of claim 1, further including an act of, during execution of the lighting program in act (D), changing a speed at which the lighting program is executed from a programmed speed to a new speed in response to a timing device coupled to the second device.

23. The method of claim 1, further including an act of, during execution of the lighting program in act (D), changing a speed at which the lighting program is executed from a programmed speed to a second speed in response to a timing device disposed within the second device.

24. The method of claim 1, wherein the second device is coupled to a cue table that identifies various actions to be taken during execution of the lighting program in response to at least two inputs received at the cue table, and wherein the method further includes an act of, during execution of the lighting program in act (D), changing a speed at which the lighting program is executed from a programmed speed to a new speed in response to an output of the cue table.

25. The method of claim 1, wherein the second device is coupled to a cue table that identifies various actions to be taken during execution of the lighting program in response to at least two inputs received at the cue table, and wherein the method further includes an act of, during execution of the lighting program in act (D), changing a parameter of at least one effect assigned, in the lighting program, to at least one of the plurality of lights from a programmed parameter to a new parameter in response to an output of the cue table.

26. The method of claim 1, wherein the second device is coupled to a cue table that identifies various actions to be taken during execution of the lighting program in response to at least two inputs received at the cue table, and wherein the method further includes an act of, during execution of the lighting program in act (D), changing an effect assigned in the lighting program to at least one of the plurality of lights from a programmed effect to a new effect in response to an output of the cue table.

27. A computer readable medium encoded with a lighting program that, when executed, controls a plurality of lights and defines a sequence of states for the plurality of lights, the lighting program being encoded in a data format that represents a final data stream for directly controlling the plurality of lights without format conversion, the data format having a plurality of frames, each one of the plurality of frames corresponding to one state in the sequence of states for the plurality of lights, wherein encoding the computer readable medium includes storing a specific frame for each of the states, the data format representing a final data stream capable of directly controlling the plurality of lights to execute the sequence.

28. The computer readable medium of claim 27, wherein the lighting program is a first lighting program, and wherein the computer readable medium is further encoded with a second lighting program in the data format having the plurality of frames that, when executed, controls the plurality of lights.

29. The computer readable medium of claim 27, wherein the lighting program includes at least one variable that, at execution time, is to be provided by a device to which the computer readable medium is coupled.

30. The computer readable medium of claim 27, wherein the lighting program includes data to control at least one non-light device in addition to the plurality of lights.

31. An apparatus for executing a lighting program to control a plurality of lights, the lighting program defining a sequence of states for the plurality of lights, the apparatus comprising:

at least one storage medium to store the lighting program in a data format having a plurality of frames, each one of the plurality of frames corresponding to one state in the sequence of states for the plurality of lights, and the lighting program being stored by storing a specific frame for each of the states, the data format representing a final data stream for directly controlling the plurality of lights without format conversion;

a network output port for providing an external interface to directly communicate with the plurality of lights; and at least one controller that executes the lighting program by reading the plurality of frames from the at least one storage medium and passing the final data stream to the network output port, which in turn passes the final data stream to the plurality of lights to control the plurality of lights.

32. The apparatus of claim 31, further including an input port, coupled to the at least one storage medium, to enable the lighting program to be loaded into the at least one storage medium from another device while the at least one storage medium is disposed in the apparatus.

33. The apparatus of claim 31, wherein the lighting program is a first lighting program, and wherein the at least one storage medium further includes a second lighting program stored thereon in the data format having the plurality of frames.

34. The apparatus of claim 33, further including a user interface that enables selection between the first and second lighting programs for execution.

35. The apparatus of claim 33, further including at least one input to receive information from an external device concerning an external environment, and wherein the controller automatically, without user intervention, switches from execution of the first lighting program to execution of the second lighting program in response to the received information.

36. The apparatus of claim 31, further including at least one input to receive information from an external device concerning an external environment, and wherein the at least one controller includes means for, during execution of the lighting program, changing a parameter of at least one effect assigned, in the lighting program, to at least one of the plurality of lights from a programmed parameter to a new parameter in response to the received information.

37. The apparatus of claim 31, further including at least one input to receive information from an external device concerning an external environment, and wherein, during execution of the lighting program, the controller changes an effect assigned in the lighting program to at least one of the plurality of lights from a programmed effect to a new effect in response to the received information.

38. The apparatus of claim 31, further including at least one input to receive information from an external device concerning an external environment, and wherein, the at least one controller includes means for, during execution of the lighting program, changing an effect assigned in the lighting program to at least one of the plurality of lights from a programmed effect to a new effect in response to the received information.

39. The apparatus of claim 31, further including at least one input to receive information from an external device concerning an external environment, and wherein, during execution of the lighting program, the controller changes a parameter of at least one effect assigned, in the lighting program, to at least one of the plurality of lights from a programmed parameter to a new parameter in response to the received information.

40. The apparatus of claim 31, further including at least one input to receive information from an external device concerning an external environment, and wherein, during execution of the lighting program, the controller changes a speed at which the lighting program is executed from a programmed speed to a new speed in response to the received information.

41. The apparatus of claim 31, in combination with a sensor, wherein the apparatus further includes at least one input coupled to the sensor to receive information concerning an external environment, and wherein, during execution of the lighting program, the controller automatically, without user intervention, changes a speed at which the lighting program is executed from a programmed speed to a new speed in response to the received information.

42. The apparatus of claim 31, in combination with a sensor, wherein the apparatus further includes at least one input coupled to the sensor to receive information concerning an external environment, and wherein, during execution of the lighting program, the controller automatically, without user intervention, changes an effect assigned in the lighting program to at least one of the plurality of lights from a programmed effect to a new effect in response to the received information.

43. The apparatus of claim 31, in combination with a sensor, wherein the apparatus further includes at least one input coupled to the sensor to receive information concerning an external environment, and wherein, during execution of the lighting program, the controller automatically, without user intervention, changes a parameter of at least one effect assigned, in the lighting program, to at least one of the plurality of lights from a programmed parameter to a new parameter in response to the received information.

44. The apparatus of claim 31, wherein the apparatus is display-less.

45. The apparatus of claim 31, wherein the lighting program is further capable of directly controlling at least one non-light device in addition to the plurality of lights.

46. The apparatus of claim 31, further including at least one timer that is coupled to the at least one controller so that the at least one controller can alter execution the lighting program based on the timer.

47. The apparatus of claim 31, further comprising:

at least one input to receive information from an external device concerning an external environment; and a cue table that identifies various actions to be taken during execution of the lighting program in response to the received information;

wherein the cue table has an output coupled to the at least one controller so that the at least one controller can alter execution of the lighting program based upon the output of the cue table.

48. The apparatus of claim 47, wherein the at least one controller, during execution of the lighting program, changes a parameter of at least one effect assigned, in the lighting program, to at least one of the plurality of lights from a programmed parameter to a new parameter in response to the output of the cue table.

49. The apparatus of claim 47, wherein the at least one controller, during execution of the lighting program, changes an effect assigned in the lighting program to at least one of the plurality of lights from a programmed effect to a new effect in response to the output of the cue table.

50. The apparatus of claim 47, wherein the at least one controller, during execution of the lighting program, changes a speed at which the lighting program is executed from a programmed speed to a new speed in response to the received information.

51. The apparatus of claim 47, wherein the at least one input includes a plurality of inputs, and wherein the cue table includes a plurality of functions to interpret actions to be taken during execution of the lighting program based upon combined information received at the plurality of inputs.

52. The computer readable medium of claim 27, wherein the lighting program is created on a first device, and wherein the computer readable medium is not coupled to the first device when the lighting program is executed.

53. The apparatus of claim 31, wherein the lighting program is created on a first device, and wherein the apparatus is not coupled to the first device when the lighting program is executed.

* * * * *

UNITED STATES PATENT AND TRADEMARK OFFICE

CERTIFICATE OF CORRECTION

PATENT NO. : 7,353,071 B2
APPLICATION NO. : 09/870418
DATED : April 1, 2008
INVENTOR(S) : Michael K. Blackwell et al.

It is certified that error appears in the above-identified patent and that said Letters Patent is hereby corrected as shown below:

The sheets of drawings consisting of figures 3, 4 and 5 should be deleted to appear as per attached figures 3, 4 and 5.

Signed and Sealed this

Fifth Day of January, 2010

David J. Kappos

*Director of the United States Patent and Trademark Office*